(12) United States Patent
Blanquart et al.

(10) Patent No.: US 8,610,790 B2
(45) Date of Patent: Dec. 17, 2013

(54) PROGRAMMABLE DATA READOUT FOR AN OPTICAL SENSOR

(75) Inventors: Laurent Blanquart, Westlake Village, CA (US); John D. Wallner, Calabasas, CA (US); Qianjiang Mao, Chino Hills, CA (US)

(73) Assignee: AltaSens, Inc, Westlake Village, CA (US)

( * ) Notice: Subject to any disclaimer, the term of this patent is extended or adjusted under 35 U.S.C. 154(b) by 160 days.

(21) Appl. No.: 13/217,797

(22) Filed: Aug. 25, 2011

(65) Prior Publication Data
US 2013/0050547 A1 Feb. 28, 2013

(51) Int. Cl.
*H04N 5/225* (2006.01)

(52) U.S. Cl.
USPC .................................. 348/222.1; 348/333.01

(58) Field of Classification Search
USPC .................................. 348/222.1, 294, 333.01
See application file for complete search history.

(56) References Cited

U.S. PATENT DOCUMENTS

| | | | |
|---|---|---|---|
| 4,213,119 A | 7/1980 | Ward et al. | |
| 4,680,704 A | 7/1987 | Konicek et al. | |
| 6,274,261 B1 * | 8/2001 | Tinker et al. | 429/407 |
| 6,996,117 B2 | 2/2006 | Lee et al. | |
| 2003/0145136 A1 | 7/2003 | Tierney et al. | |
| 2003/0164785 A1 | 9/2003 | Canini et al. | |
| 2005/0270401 A1 * | 12/2005 | Hatano | 348/335 |
| 2007/0296858 A1 | 12/2007 | Eymard et al. | |
| 2008/0106623 A1 * | 5/2008 | Oshima | 348/294 |
| 2010/0007754 A1 * | 1/2010 | Doida | 348/222.1 |
| 2010/0020210 A1 * | 1/2010 | Tsunekawa et al. | 348/294 |
| 2010/0325513 A1 | 12/2010 | Donegan et al. | |

OTHER PUBLICATIONS

International Search Report for PCT Patent Application No. US2012/051661 dated Nov. 2, 2012, 15 pages.

* cited by examiner

*Primary Examiner* — Gevell Selby
(74) *Attorney, Agent, or Firm* — Turocy & Watson, LLP

(57) ABSTRACT

Programmable data readout for optical image sensors is disclosed herein. By way of example, vertical skipping and vertical mixing functionality is provided that is responsive to commands, enabling dynamic selectivity and processing of optical sensor data. A data output control system can be incorporated with or coupled to data readout circuitry of an optical sensor. The output control system comprises a vertical skipping engine that can dynamically select a subset of data for output in response to one or more skipping commands, and a vertical mixing engine that can act upon subsets of data in accordance with processing functions called by respective mixing commands. The disclosure provides simplification of selective data readout and processing for image sensors, potentially reducing design, testing, and maintenance overhead, as well as cost and number of integrated circuit components.

30 Claims, 13 Drawing Sheets

| SKIP COMMAND INSTRUCTIONS 504 ||| SKIP COMMAND 506 | SPI WRITES 508 ||
|---|---|---|---|---|---|
| ACTIVE 510 | DIRECTION 512 | # OF ROWS 514 | | REGISTER ADDRESS 516 | REGISTER DATA 518 |
| YES (1) | FORWARD (0) | 1 | 0 | VCLEAR_SKIP01_SPI (0x0e4) [7:0] | 1000 0011 1000 0001 (0x8381) |
| YES (1) | FORWARD (0) | 3 | 1 | VCLEAR_SKIP01_SPI (0x0e4) [15:8] | |
| NO (0) | — | — | 2 | VCLEAR_SKIP23_SPI (0x0e5) [7:0] | 0000 0000 0000 0000 (0x0000) |

| ACTION | | | | SPI WRITES | |
|---|---|---|---|---|---|
| COMMAND NAME 808 | GoTo TARGET VALUE 810 | COMMAND VALUE 812 | MIX COMMAND NUMBER | REGISTER ADDRESS 814 | REGISTER DATA 816 |
| MIX_WRITE_TO_MEM | 7 | 2 | 0 | MIX_COMMAND1_0 (0x0a3) [7:0] | 1110 0010 1110 0010 (0xe2e2) |
| MIX_WRITE_TO_MEM | 7 | 2 | 1 | MIX_COMMAND1_0 (0x0a3) [15:8] | |
| MIX_READ_ADD_SEND_DIV2 | 7 | 5 | 2 | MIX_COMMAND3_2 (0x0a4) [7:0] | 1110 0101 0000 0101 (0xe505) |
| MIX_READ_ADD_SEND_DIV2 | 0 | 5 | 3 | MIX_COMMAND3_2 (0x0a4) [15:8] | |

PROGRAMMABLE DATA READOUT FOR AN OPTICAL SENSOR

BACKGROUND

Optical image sensors are commonly used in a wide array of electronic devices. These image sensors can vary in size, in features, or in technology, as well as other characteristics, and can be configured to be suitable for various electronic applications. Such applications can include, for instance, digital cameras, video cameras and camcorders, camera modules for laptop computers, flat-screen monitors or portable handheld devices (e.g., mobile phones, personal digital assistants (PDAs), . . . ), conspicuous or inconspicuous video surveillance equipment, and so on. As digital cameras and video cameras become more popular with the consuming public, demands for additional features and more powerful electronics tend to drive research and development for image sensors.

Most image sensors employ charge-coupled device (CCD) or complementary metal-oxide semiconductor (CMOS) technology. Both technologies capture visible radiation and convert received radiation into electrical signals. The CCD technology is an analog device that converts incident light information into a voltage one pixel at a time, as the information is output from the CCD chip. The CMOS technology comprises an active pixel sensor array that receives light energy and complementary circuitry that converts the light energy into voltage. The voltage output can then be displayed on a video display, generally following image processing of the voltage information.

For CMOS technology, readout circuitry can be employed to transfer information from an image sensor to a video display, for instance (or to data storage, or other suitable data processor). In some cases, readout circuitry simply directs all data from the image sensor to the video display. In other cases, readout circuitry can selectively direct a subset of the image sensor data to the video display. This can facilitate fitting image sensor data to a screen size, for instance, or averaging subsets of data to mitigate image artifacts, or other examples. Dedicated hardware can be integrated into a CMOS chip to provide this selective readout capability.

Although dedicated readout circuitry can provide desirable features for data readout, it can also add some overhead and complexity. For instance, supporting multiple readout functions can involve multiple such configurations. This tends to increase design, testing and evaluation overhead. Generally, however, the benefits provided in flexibility can outweigh the overhead costs for certain applications, and selective readout hardware has become increasingly popular for optical image sensors.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

Providing for programmable data readout for optical image sensors is disclosed herein. In one example, programmable vertical skipping is provided to selectively output subsets of data from an image sensor. Moreover, the skipping is not limited to a single architecture as is typical for hardware skipping implementations. Rather, programmable vertical skipping can be responsive to commands, and can implement dynamic selectivity of data readout from the optical image sensor. This results in much greater simplification of selective data readout, potentially reducing design, testing, and maintenance overhead, as well as cost of integrated circuit components. Furthermore, it enables much greater flexibility in selective data readout, enabling an image sensor to be compatible with a wider array of display devices.

In another example, programmable mixing is provided to selectively mix subsets of data output from an image sensor. The programmable mixing can comprise a set of functions for performing mathematical or statistical operations on subsets of the data. The operations can include, for instance, adding or subtracting subsets of data, averaging subsets of data, clipping data values, or the like, or a suitable combination thereof. In addition, selection of functions for operating on subsets of the data can be in response to commands, facilitating dynamic and flexible mixing that can be adapted to fit different applications, display devices, or the like.

In yet another example, programmable vertical skipping is provided in conjunction with programmable vertical mixing. Respective sets of commands can be configured to facilitate dynamic execution of skipping and mixing functions. A state machine can be employed for storing series of such commands. A skipping engine can execute skipping commands and select subsets of data for output from an image sensor, and a mixing engine can execute mixing commands to perform operations on some or all of the selected subsets of data. Accordingly, the subject disclosure provides a new paradigm in data transfer capabilities for image sensors that can greatly increase a number of data output modes, while potentially reducing manufacturing costs, failure costs, design overhead and testing overhead, among other benefits.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

BRIEF DESCRIPTION OF THE DRAWINGS

FIG. 5 illustrates a diagram of an example skipping function for selective output of image sensor data in a particular aspect.

FIG. 8 depicts a diagram of an example mixing function operable upon select subsets of data output from an image sensor.

DETAILED DESCRIPTION

Figure 1:
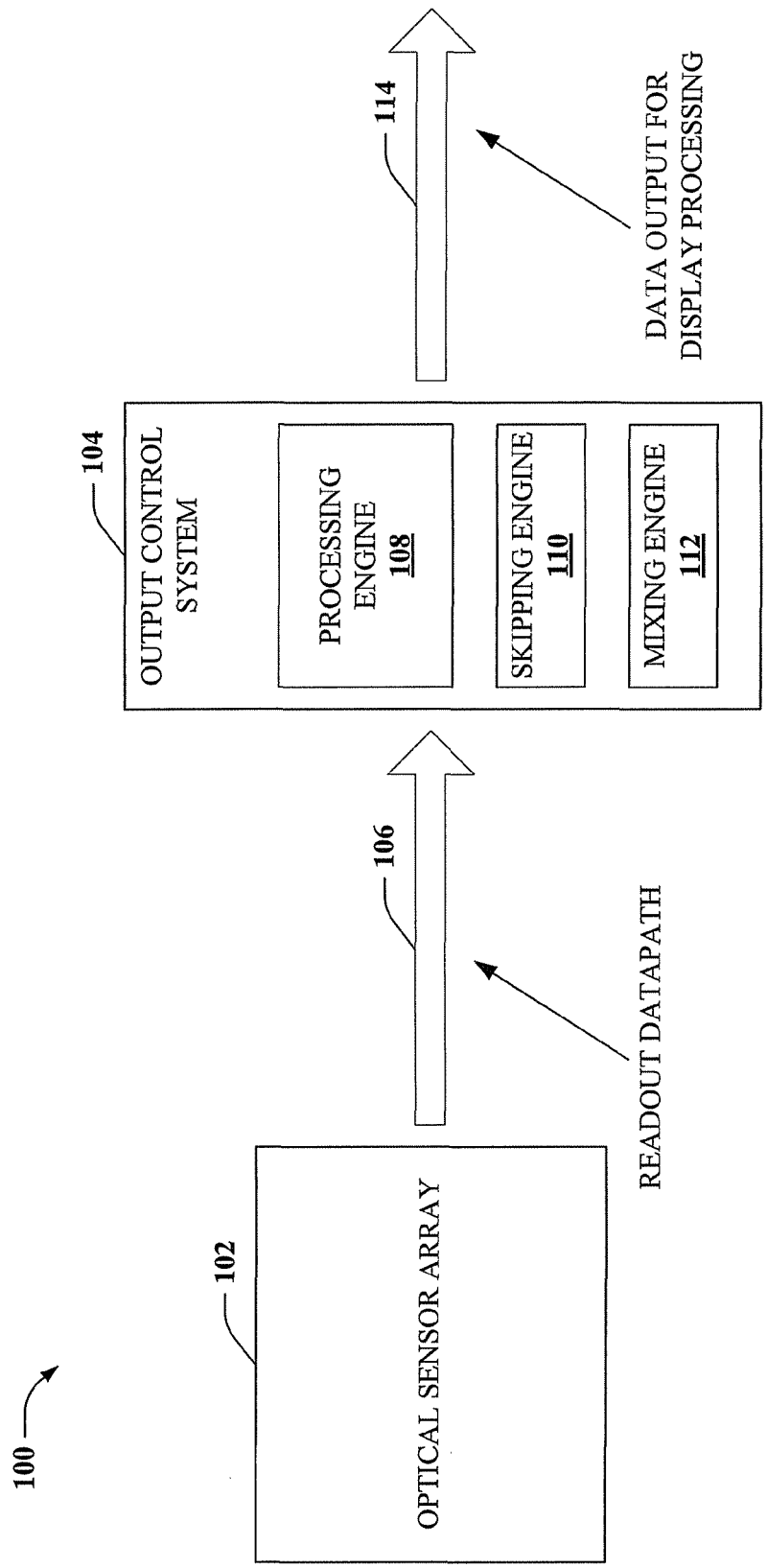
FIG. 1 depicts a block diagram of a sample system for programmable image sensor data readout according to disclosed aspects.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

As utilized herein, terms "component," "system," and the like are intended to refer to an electronic or computing entity, either hardware, software (e.g., in execution), or firmware. For example, a component can be one or more semiconductor transistors, an arrangement of semiconductor transistors, a circuit, data transfer or integration circuitry, an electronic clock, a process running on a processor, a processor, an object, a state machine, a computer, etc. By way of illustration, a circuit, a transistor array electrically connected with the circuit, or a controller that manages data flow between the transistor array and the circuit can be a component. Furthermore, an apparatus can comprise one or more components that operate together as a system. For instance, the apparatus can comprise an arrangement of electronic hardware, data transfer circuits, logical control circuits, memory circuits that store processing instructions, and a processing circuit that implements the processing instructions in a manner suitable to perform an electronic or computing task.

Furthermore, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The term "article of manufacture" as used herein is intended to encompass an electronic device, a semiconductor device, a computer, or a computer program accessible from any computer-readable device, carrier, or media. By way of example, and not limitation, computer-readable media can include hardware media, or software media. In addition, the media can include storage media, transport media or communication media. For example, computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include a data transfer bus, a signal interface (e.g., a wireless communication interface), or the like. Of course, those skilled in the art will recognize many modifications can be made to this configuration without departing from the scope or spirit of the disclosed subject matter.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Various aspects disclosed herein provide for selective output and processing of data from an image sensor. The image sensor collects optical information and converts the optical information into electronic data (e.g., electronic signals). This electronic data can be read out from the image sensor utilizing readout circuitry. One example of such readout circuitry can include a set of vertical busses that respectively transfer data from respective rows of the image sensor, a horizontal bus that collects and transfers data from the set of vertical buses, an operational amplifier for scaling voltage of electronic data provided by the horizontal bus, and an analog to digital converter for converting scaled voltage data into digital data. It should be appreciated, however, that the subject disclosure is not limited to this example, as fewer or more components can be utilized for the readout circuitry.

Some readout circuitry is configured to process image sensor data, whether digital or analog, in addition to simply outputting or reading the data from the image sensor. This processing can include, for instance, selective data output, where data from a subset of rows of the image sensor is output from the image sensor, and data from other rows is ignored, discarded or otherwise not provided for image processing and display. Selecting the subset of rows can be accomplished with vertical skipping functions that apply a function which distinguishes some rows for outputting data and others for not outputting the data. Vertical skipping can be implemented to match data output from an image sensor to resolution of a digital display, for instance. If the image sensor has more photodetector rows than vertical resolution (rows of pixels) of the display device, a subset of the data collected by the photodetector rows is generally displayed for a given image. By skipping some photodetector rows and outputting data from a subset of the rows, the image sensor data output can be matched to the vertical resolution of the digital display.

Additionally, image sensor data processing can include mixing functions that apply a function(s) to data otherwise selected for output. Skipping and mixing functionality can be configured to be separate, comprising skipping without mixing, or mixing without skipping, for instance. However, conventional processing of image sensor data output is done with dedicated electronic processing hardware having limited or no reconfiguration capability.

In order to support multiple skipping or mixing functions, conventional systems tend to provide separate hardware engines for each skipping, mixing, or skipping and mixing function. However, these conventional systems are expensive to design, to test and to maintain. For instance, functions implemented in hardware are generally designed separately for each function, tested separately, and so on. Further, errors in design might not be identified prior to implementation and hardware manufacture, often requiring re-design as well as re-implementation and re-manufacture, imposing substantial costs for such errors.

To alleviate problems with conventional output processing of image sensor data, the subject disclosure provides for programmable data processing. In one example, a vertical skipping pattern(s) for an image sensor is provided as a programmable function. In another example, a mixing function(s) for the image sensor is provided as a programmable function. In yet other disclosed examples, combined skipping and mixing functionality is provided as one or more programmable functions.

According to particular aspects of the subject disclosure, a vertical skipping engine is provided that can be coupled with image sensor readout circuitry, or otherwise to control selective data output from the image sensor. More specifically, the vertical skipping engine can be programmable and dynamically select subsets of rows for data output in response to a skipping command(s). As one specific example, the command can specify a number of rows to skip, and a direction for skipping (e.g., up or down, forward or backward, etc.). According to other aspects, a mixing engine is provided for operating on (e.g., applying a function to) data output from the image sensor. The mixing engine can be operable upon a subset of data selected by the vertical skipping engine, or upon all data collected by the image sensor (e.g., where all data is output, or otherwise when no skipping is implemented for data output). Further, the mixing engine is responsive to a mixing command(s), which can identify a particular mixing function to apply to subsets of the output data (e.g., to respective subsets of rows selected for data output). Because the vertical skipping engine and mixing engine are responsive to commands, a large number of skipping or mixing modes can be supported by these engines, while greatly mitigating an amount of hardware required to implement the modes as compared to conventional implementations. Accordingly, the subject disclosure can provide substantial reduction in design overhead, testing overhead, maintenance overhead, and error costs, as well as other benefits.

Referring to the drawings, FIG. 1 illustrates a block diagram of an example system 100 that provides programmable data output for an image sensor according to one or more aspects of the subject disclosure. System 100 can be employed in conjunction with various image capture equipment, including a camera, camcorder or video camera, microcamera, and so on. Further, such equipment can be integrated with various electronic devices, such as hand held computing devices, mobile phones, portable cameras, computers (e.g., including desktop computers, laptop computers, personal digital assistants, . . . ), digital displays, flat panel displays, consumer electronic devices (e.g., digital wristwatch), hidden or conspicuous surveillance equipment, and so forth.

System 100 can comprise an optical sensor array 102. Optical sensory array 102 can include an array of photodetectors, generally arranged in multiple rows and columns. Optical sensor array 102 can include a charge-coupled device (CCD) image sensor, a complementary metal-oxide semiconductor (CMOS) image sensor, or any other suitable image sensor device. Additionally, the array of photodetectors can include any suitable photodetector technology capable of capturing, receiving, measuring, etc., incident radiant energy (or luminous energy/light energy where adapted for human wavelength sensitivities) and converting the incident radiant energy into an electric signal (e.g., a voltage, a current, a charge, . . . ). Optical sensor array 102, comprising an array of photodetectors, can therefore generate a set of such electric signals corresponding to respective incident radiant energy received by a set of photodetectors in the array.

System 100 can further comprise an output control system 104. Output control system 104 is communicatively connected with (or, e.g., included as a part of) a readout datapath 106 associated with optical sensor array 102. For instance, vertical skipping functionality can be part of a readout function associated with optical sensor array 102, whereas mixing functionality can be a part of a datapath function associated with optical sensor array 102. In a particular aspect, readout datapath 106 can comprise the readout function and the datapath function, as well as other hardware or software modules involved in transferring data from optical sensor array 102 to external processing devices (e.g., image processing, video processing, video display, image/video data storage, etc.). It is to be appreciated that this arrangement of skipping and mixing functionality can be applied to other disclosed embodiments, where suitable.

In one aspect of the subject disclosure, output control system 104 can be configured to control the output of data from optical sensor array 102. In another aspect, output control system 104 can be configured to receive data that is output by optical sensor array 102 and filter or process the received data for further output. As is described in detail below, output control system 104 can be configured to provide programmable output and processing of data from optical sensor array 102.

Output control system 104 can comprise a processing engine 102 for receiving commands pertaining to output of data generated by optical sensor array 102. Commands can be of multiple types; examples of types of commands include vertical skipping commands and mixing commands. Additionally, processing engine 108 can store skipping commands and mixing commands in queue for further processing (e.g., in a set of memory registers; see FIGS. 3, 4 and 7, infra). The commands can be accessed and executed by a set of data engines configured to control the output of a subset of data from optical sensor array 102 or to perform logic operations on the data in response to the commands.

Particularly, the set of data engines can include a vertical skipping engine 110. Skipping engine 110 can be configured to select a subset of rows of optical sensor array 102 from which data is output from system 100. Moreover, the selection can be in accordance with a skipping command received by processing engine 108. An individual skipping command as well as sets of multiple skipping commands can be configured or combined to support multiple skipping modes. The configuration and combination of skipping commands can result in a great deal of power and flexibility for output control system 104 in providing selective output of optical sensor array data from system 100. Moreover, this power and flexibility can be achieved without added costs and chip space often associated with separate hardware configurations for respective skipping modes.

Vertical skipping is a useful feature for reading data from optical sensors. Skipping modes can be utilized, for instance, to match sensor and display components of a camera system provided by different manufacturers. As an example, a photodetector array (e.g., optical sensor array 102) could have a number, x, of rows of photodetectors, whereas a digital display associated with system 100 might have a vertical resolution with a smaller number, y, of resolution lines. To output an equivalent amount of vertical data to match the digital display, fewer than all of the x rows can be output from system 100. One way of accomplishing this, is to configure a skipping command(s) to select a subset of data (e.g., a subset of rows) to be output from system 100, where the subset of data matches the vertical resolution y of the digital display. A more detailed description of example skipping commands is given at FIGS. 4, 5, and 6, infra.

In addition, the set of data engines can include a vertical mixing engine 112 configured to act upon data output from optical sensory array 102 in response to a mixing command. Mixing commands incorporate a set of code primitives configured to call line mixing functions to act upon such data. Examples of line mixing functions can include line addition, line subtraction, line averaging, line clipping, and others (e.g., see FIG. 7, infra). Processing of data can include application of a line mixing function to data output by optical sensor array 102. In at least one aspect of the subject disclosure, selective output or processing of data refers to skipping engine 110 selecting (or filtering) a subset of rows to be output from optical sensor array 102 and mixing engine 112 applying a line mixing function(s) to the subset of rows of data, in response to a skipping command or mixing command, respectively, received at processing engine 108.

Data selected or processed by output control system 104 can be transmitted on an output bus 114. Output bus 114 delivers the data for subsequent display processing. Thus, output bus 114 can be connected to an image processor, video processor, etc., of a camera device according to various aspects of the subject disclosure. In an alternative, or additional aspect, output bus 114 can deliver the data to a storage device local to system 100 or at a remote position (e.g., on a network, an external hard drive, an external computer, . . . ). Specific configurations for skipping and mixing commands, as well as example skipping and mixing implementations are described in more detail, infra.

Figure 2:
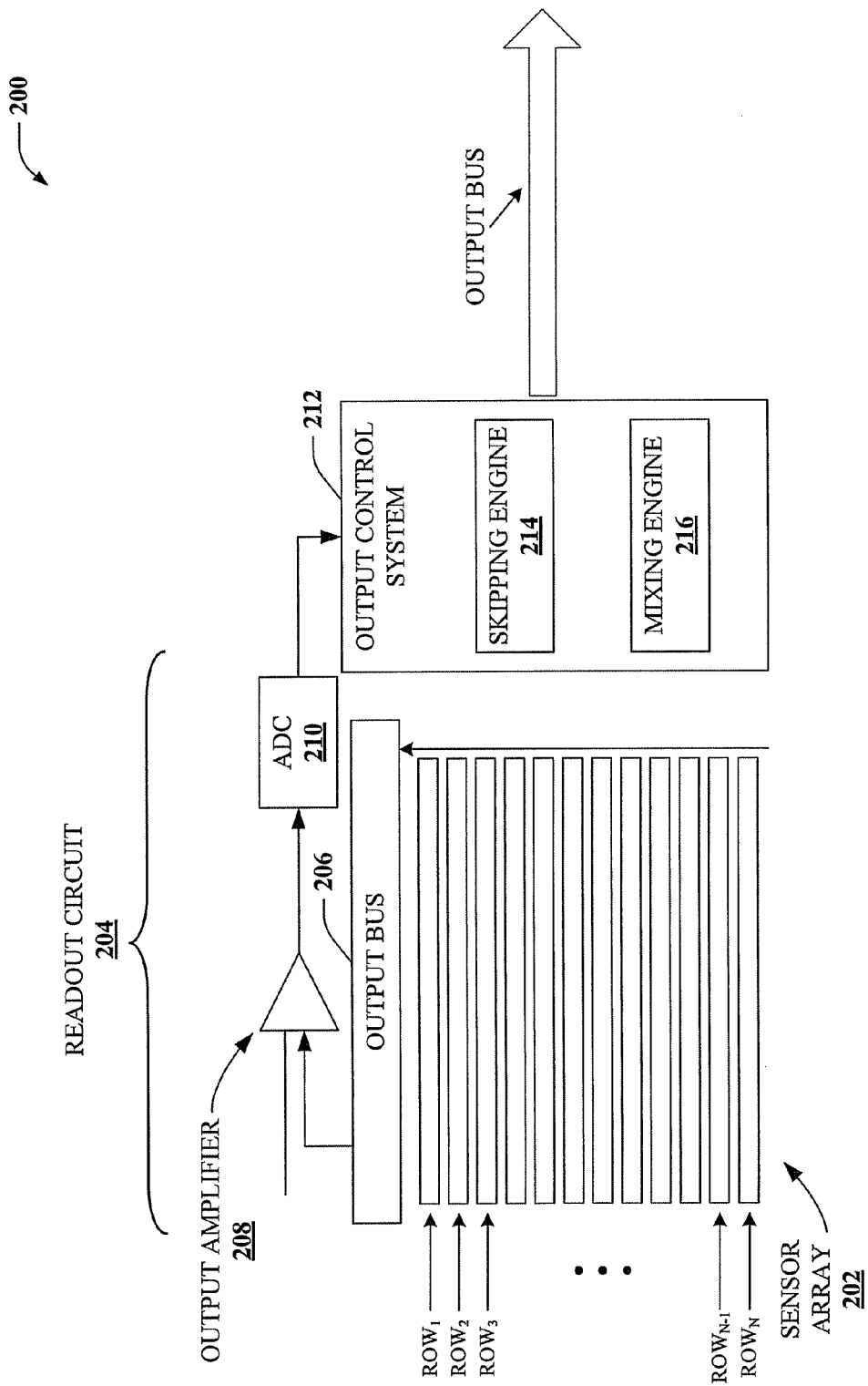
FIG. 2 illustrates a block diagram of an example system for dynamic data processing for image sensor output circuitry according to further aspects.

FIG. 2 illustrates a block diagram of an example system 200 that facilitates data readout for an optical sensor. System 200 can comprise an optical sensor array 202, electrically connected to a data readout circuit 204. Additionally, data readout circuit 204 can be communicatively connected with an output control system 212. In at least one aspect of the subject disclosure, output control system 212 can be substantially similar to output control system 104 of FIG. 1, supra. However, the subject disclosure is not limited to this aspect(s), and output control system 212 can have more or fewer features than output control system 104.

As depicted, optical sensor array 202 can comprise multiple rows of photodetectors, each row including a set of photodetectors. These rows of photodetectors can include $row_1, row_2, row_3, \ldots, row_{N-1}, row_N$ (referred to collectively as $row_1$-$row_N$), as depicted. Electric signals (also referred to herein generically as data) generated by respective photodetector rows can be sent to readout circuit 204. In at least one aspect of the subject disclosure, output control system 212 can select and cause all or a subset of the rows of optical sensor array 202 to output data to readout circuit 204, and optionally select an order in which rows output respective data. In another aspect, output control system 212 can instead receive data from optical sensor array 202 that is controlled, for instance, by another entity (e.g., an output processor associated with readout circuit 204—not depicted).

Readout circuit 204 can comprise an output bus 206 for receiving data from rows of optical sensor array 202. The rows can output data one row at a time, generally, although system 200 need not be limited to this characteristic, and multiple rows of data can be output concurrently where suitable, in at least one aspect of the subject disclosure. Data received by output bus 206 can be forwarded to an output amplifier 208. Output amplifier 208 can scale up (or scale down, where suitable) a magnitude of data sent by output bus 206. Scaled data is sent to an analog to digital converter (ADC) 208. ADC 208 provides a digital version of the amplified data to output control system 212.

Data received from readout circuit 204 can be processed by mixing engine 216. As is described in more detail herein, skipping engine 214 can execute one or more skipping commands received by output control system 212. The skipping command(s) can be configured to identify or select a subset of rows of optical sensor array 202 for output from system 200 (e.g., see FIGS. 4 and 5, infra). By executing the skipping command(s), skipping engine 214 can cause optical sensor array 202 to output data only from the identified/selected subset of rows to readout circuit 204.

Moreover, mixing engine 216 can execute one or more mixing commands received by output control system 212. The mixing command(s) can be configured to call line mixing functions to act upon subsets of data received by output control system 212. The line mixing functions can be based on a set of code primitives, providing programmatic control over data mixing functionality for system 200 (e.g., see FIGS. 7 and 8, infra). Data selected for output by skipping engine 214 or processed by mixing engine 216 can be output from system 200 on an output bus. The output bus can be communicatively connected with an image processing system, or video processing system, or the like for digital display. Alternatively, or in addition, the output bus can send data to memory, or another suitable data store.

Figure 3:
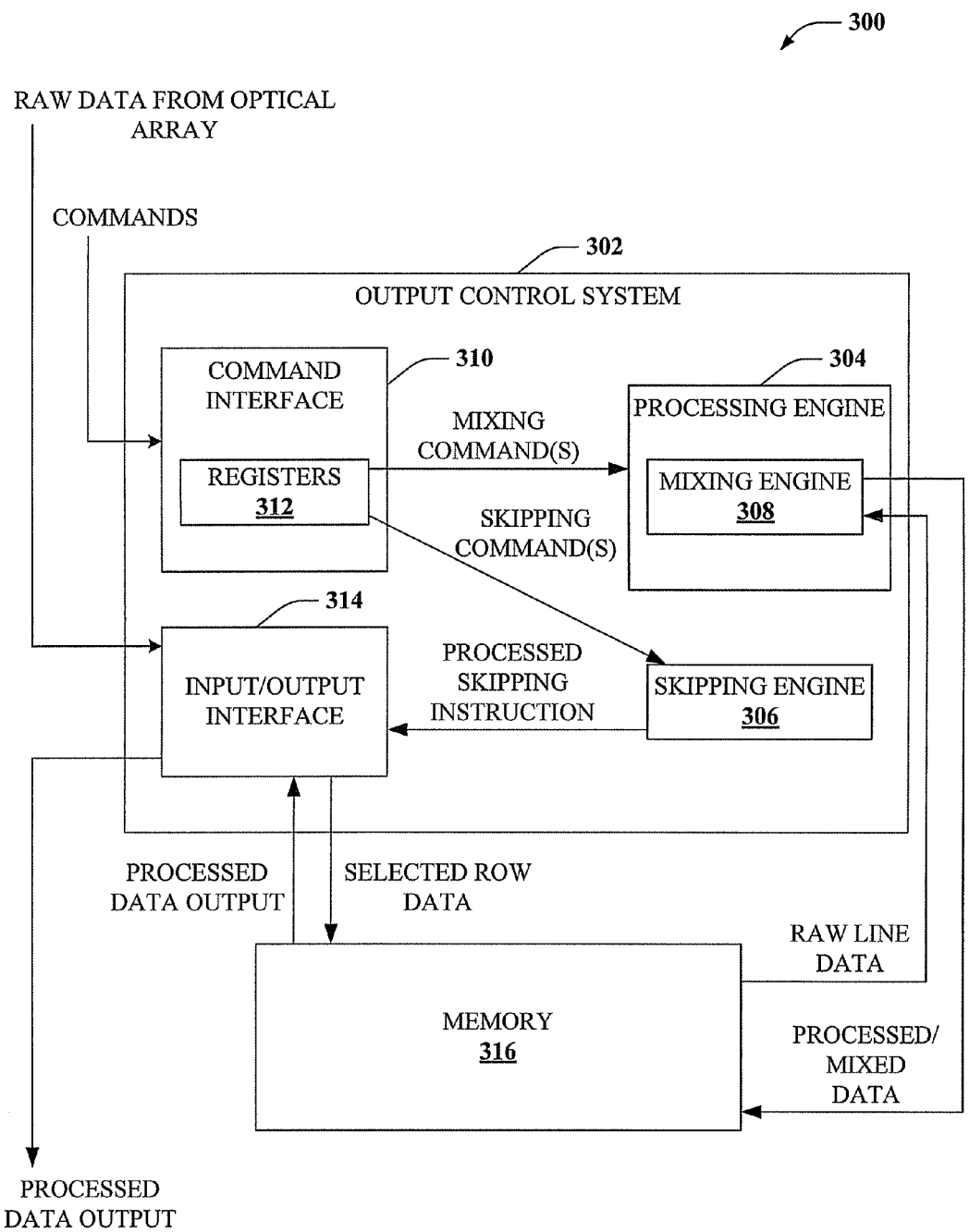
FIG. 3 illustrates a block diagram of a sample system that provides dynamic control of skipping and mixing functions for image sensor readout.

FIG. 3 illustrates a block diagram of an example data readout system 300 for an optical sensor, according to specific aspects of the subject disclosure. Data readout system 300 can be communicatively connected to readout circuitry associated with the optical sensor in some aspects, or can be integrated within the readout circuitry in other aspects. Data readout system 300 can comprise an output control system 302 configured for reading data (or selectively extracting data, in some disclosed aspects) from the optical sensor. Output control system 302 can comprise a processing engine 304 configured for receiving commands (e.g., mixing commands) pertaining to the data generated by the optical sensor. Further, output control system 302 can comprise a set of data engines configured to control the output of a subset of the data, or to perform logic operations on the data, in response to commands.

Commands can be received by a command interface 310. The commands can be transmitted by a state machine or other internal or external controller configured to automate selective output and processing of data from the optical sensor, or facilitate manual output and processing of the data (e.g., see FIG. 13, infra). These commands can be stored in a set of registers 312. As an example, respective instruction primitives and instruction values associated with the commands can be stored in associated registers 312 at register addresses assigned to the respective instruction primitives and values. In at least one aspect of the subject disclosure, command interface 310 can be a serial to parallel interface (SPI) configured to serialize and store or queue the instruction primitives and values within registers 312. Command interface 310 can sequentially output the instruction primitives and instruction values to processing engine 304 or a skipping engine 306 for selective output and processing, as described herein.

Instruction primitives and instruction values can be specific to different types of commands. For skipping commands, registers 312 can store an activation instruction (e.g., at a first register address) having an active value and an inactive value, a direction instruction associated with a forward value and a reverse value (e.g., at a second register address), and a value identifying a number of rows for skipping (e.g., at a third register address)—also referred to as a skipping number.

Examples of functionality for respective instruction primitives are described below. It should be appreciated that other suitable examples can be used alternatively, or in addition to those described, as is known in the art or made known to one of ordinary skill in the art by way of the context provided herein. The activation instruction can cause a skipping engine 306 to execute an associated skipping command in response to the skipping command containing the active value (of the activation instruction). Conversely, the activation instruction can cause skipping engine 306 to ignore the skipping command in response to the skipping command containing the inactive value. The direction instruction can cause skipping engine 306 to skip forward a number of rows identified by the skipping number in response to the skipping command containing the forward value, or cause skipping engine 306 to skip backward the number of rows in response to the skipping command containing the reverse value. These instructions and values provide significant flexibility in tailoring a set of skipping commands to selecting a particular subset of rows for data output (e.g., outputting 1 of every 3 rows, outputting 1 of every 3 rows for a certain number of rows, then outputting every row for another number of rows, and returning to outputting 1 of every 3 rows for the remainder of rows, or some other suitable example).

For mixing commands, registers 312 can store values identifying line mixing functions as well as line numbers on which the line mixing functions are to operate. These values are read by mixing engine 308 and executed. As utilized herein, a line number can be identical to a row number of an optical sensor, in one example. In another example, a line number can be one of a sequence of numbers applied only to rows selected and output by skipping engine 306. In operation, a set of line mixing functions can be stored in memory 316 based on suitable code primitives. Line mixing commands can include reference values (stored in registers 312 at suitable addresses thereof) that identify respective ones of the line mixing functions. Additionally, the line mixing commands can include a goto target value that identifies a line of data (or lines of data) for the line mixing function to act upon (stored at other addresses of registers 312). As an alternative, a line mixing command can comprise a command value that identifies a code primitive for calling (e.g., executing) one of the line mixing functions stored in memory 316. The line mixing function can be executed upon the line of data identified by the goto target value. In either case, utilizing the reference value or command value and goto target value for a particular mixing command, mixing engine 308 can call the appropriate line mixing function and execute it upon the applicable line(s) of data.

According to one particular aspect of the subject disclosure, output control system 302 can receive a set of skipping and mixing commands at command interface 310, and queue the commands in registers 312. Skipping engine 306 can access skipping commands from registers 312, and execute skipping command instructions identifying a row(s) to be output from an optical array (or rows received from the optical array to be output by system 300). Data selected by a processed skipping instruction can be received at input/output interface 314, stored in memory 316, and associated with a line number (e.g., based on a row number, or an output number, or the like). Mixing engine 308 accesses a line mixing command(s) stored in registers 312 and executes one or more line mixing functions on specified line(s) of data stored in memory 316. Results of the line mixing functions can be provided to input/output interface 314 for transfer to image processing, video processing, data storage, or the like. In one instance, results of the line mixing functions can be saved to memory 316 by mixing engine 308, and these results can be accessed as processed data output by input/output interface 314, and sent out as processed data output. This is the instance depicted by FIG. 3. In another instance, mixing engine can send results of the line mixing functions directly to input/output interface 314 for sending out as processed data output, without using memory 316 as an intermediary.

According to particular aspects, programmatic protocols can establish how skipping engine 306 or mixing engine 308 progress from one command to a subsequent command. In some aspects of the subject disclosure, subsequent commands can be tied to the value of the activation instruction. In alternative or additional aspects, a subsequent command can be pointed to or implied by a previous command. As a particular example, skipping engine 306 can be configured to return to and process a previous skipping command (e.g., the first skipping command in a sequence of such commands, a prior skipping command, etc.) in response to the skipping command containing the inactive value. Alternatively, or in addition, skipping engine 306 can be configured to proceed to a subsequent skipping command in a sequence of such commands in response to the skipping command containing the active value (e.g., where the sequence of commands is queued within registers 312, stored in memory 316, or the like). The protocol can continue a suitable logical progression of command execution until, for instance, all rows of an optical display are read out or processed. Thus, a relatively small set of skipping or mixing commands—which may each relate to only a single row/line or some other subset of the total number of rows/lines—can be utilized to output or process data from a much larger number of rows/lines. This can be accomplished by re-executing a set of commands until all rows are processed, progressing sequentially from one command to another as specified or implied by a current command (e.g., see FIGS. 5 and 8, infra).

Figure 4:
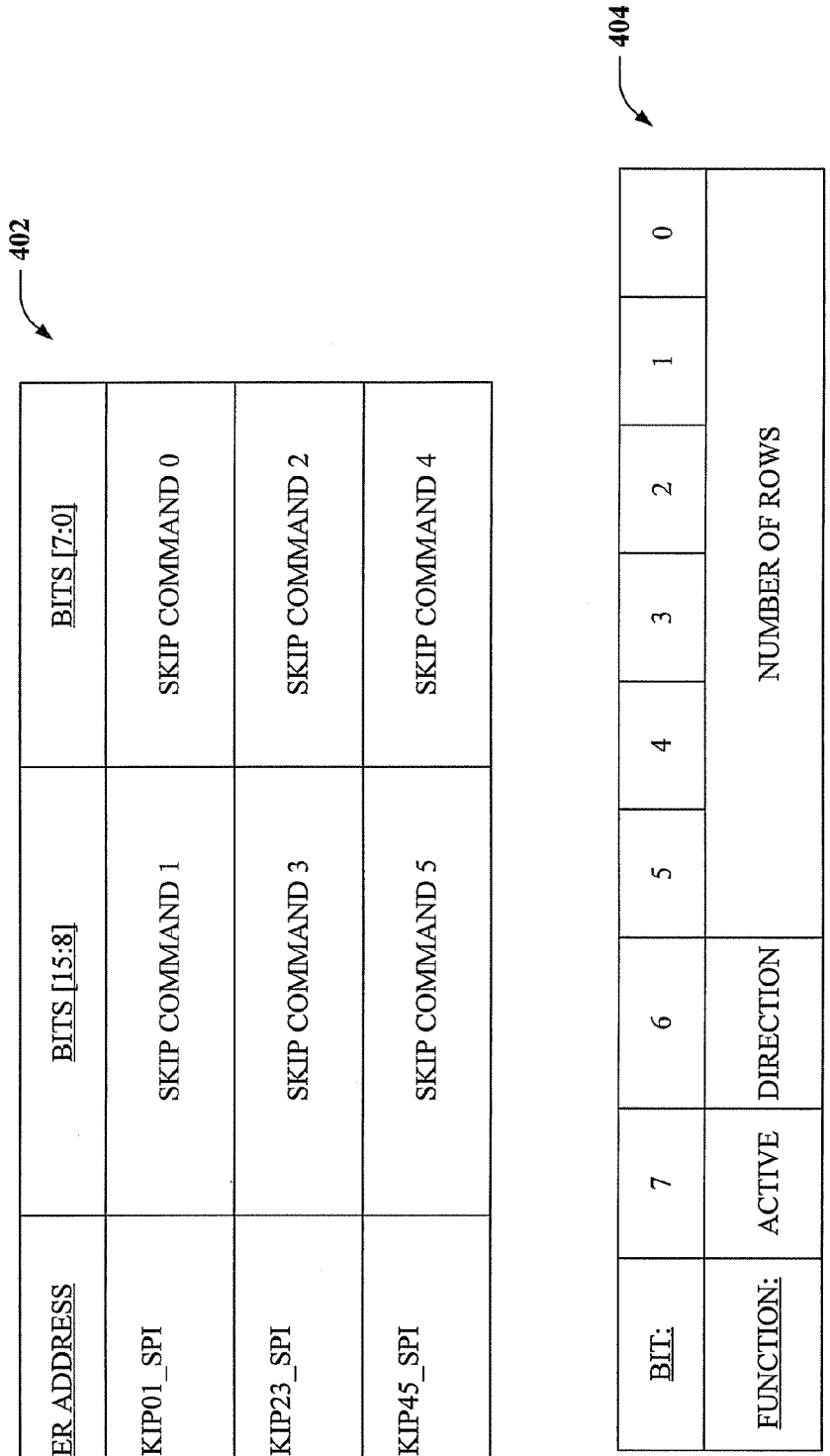
FIG. 4 depicts a diagram of an example command structure for programmable vertical skipping functionality according to other aspects.

FIG. 4 illustrates a block diagram of an example skipping command format 400 according to one or more particular aspects of the subject disclosure. Skipping command format 400 can comprise a command format 402 and bit format 404. Command format 402 is controlled by a set of vertical skipping nanocode commands (e.g., six skipping nanocode commands in at least one disclosed aspect), which can be stored in three registers (e.g., see registers 312 of FIG. 3, supra). Command format 402 associates a register address and bit sequences with respective vertical skipping nanocode commands. Note that in the depicted example, each register address is 16 bits long (containing bits 0 through 15), and therefore can hold two commands per register address concurrently. For instance, a lower order command can occupy a first set of 8 bits in a 16 bit word (e.g., the first command in the word), whereas a high order command can occupy the second set of 8 bits in the 16 bit word (e.g., the second command in the word). Other register address bit sizes are considered within the scope of the subject disclosure, however, capable of holding more or fewer commands concurrently. Moreover, more or fewer registers are within the scope of the subject disclosure, as well.

For the example of skipping command format 402, respective address registers can store two command primitives concurrently. Register address VCLEAR_SKIP01_SPI (0x0e4) can store skip command 0 in its first 8 bits, Bits [7:0] and store skip command 1 in its second 8 bits, Bits [15:18]. Likewise, register address VCLEAR_SKIP01_SPI (0x0e5) can store a third skip command, skip command 2, in its corresponding first 8 bits [7:0], and store skip command 3 in its second 8 bits [15:18]. Finally, register address VCLEAR_SKIP45_API (0x0e6) stores a fifth skip command, skip command 4, in bits [7:0] and stores skip command 5 in bits [15:18].

Bit format 404 identifies respective functions associated with respective bits of a command in the above stated example. As is depicted, each command comprises eight bits 0-7 (though these bits might be stored in bits 0-7 or 8-15 of an associated register address 402). Bit 7 is associated with an activation instruction for a given skip command. The activation instruction is associated with an active value, and an inactive value. According to particular aspects of the subject disclosure, the active value implies that the skip command should be processed and executed, and that a command having a subsequent sequence number is to be processed next (e.g., process skip command 1 next if the current command is skip command 0, etc.). Bit 6 is associated with a direction instruction, having a forward value and a reverse value. The forward value indicates whether to skip forward from a current row, or to skip backward from a current row, when selecting a next row for output from an optical array. Bits 0-5 are associated with a number of rows to be skipped, according to the direction instruction, to select the next row for output. Note that in this example, 6 bits are reserved for identifying the number of rows for skipping, facilitating a relatively large range of rows (e.g., up to $2^6-1$, or 63) that can be skipped with a single command.

Figure 6:
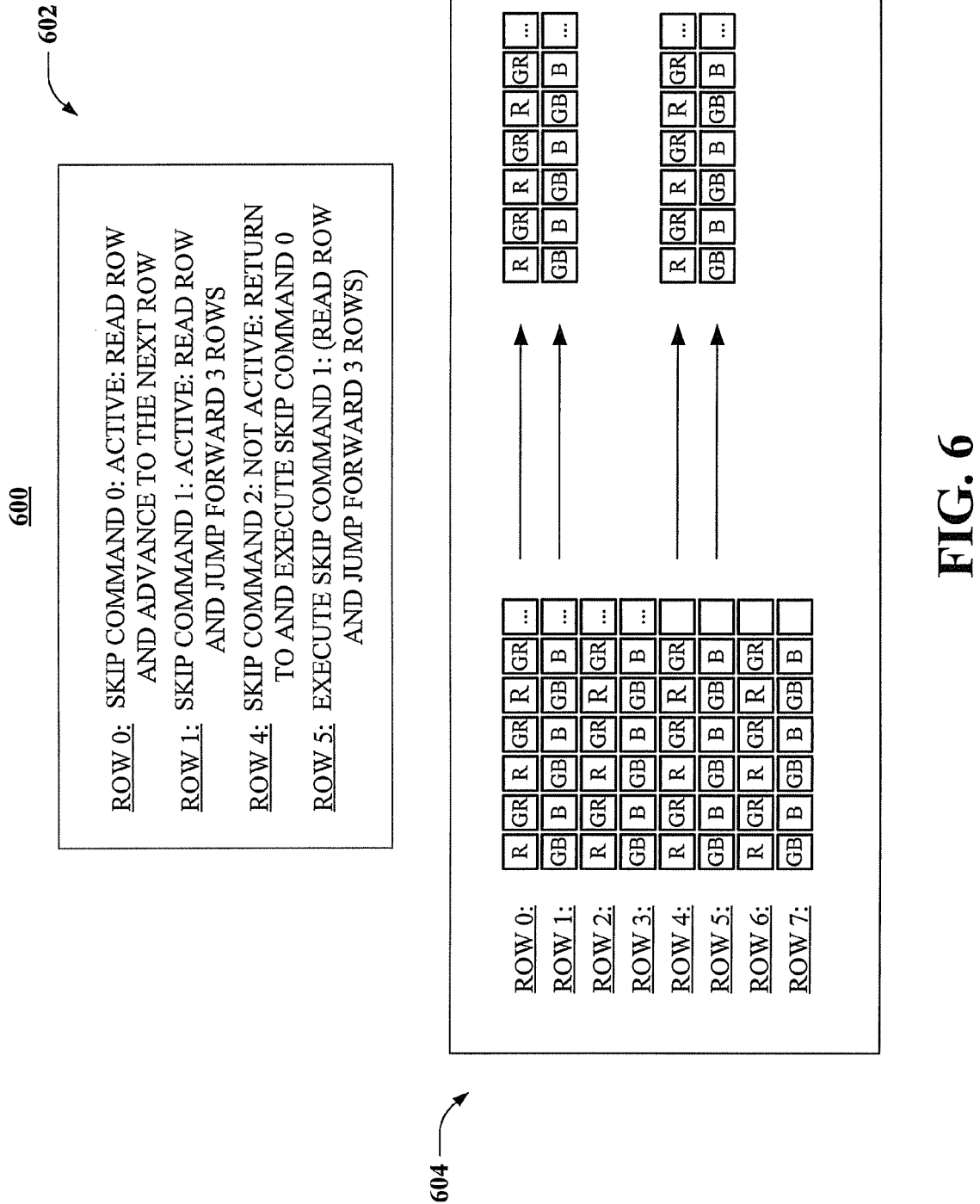
FIG. 6 depicts an example diagram of executed instructions for the example skipping function of FIG. 5.

The active/inactive, direction and number of row fields represent respective command instructions for bit format 404. Values of these respective command instructions (e.g., 0 or 1 for active/inactive respectively, 0 or 1 for forward or reverse direction, 0 to 63 for number of rows) represent respective instruction values for respective commands. Thus, each command of command format 402 (e.g., skip command 0, skip command 1, . . . ) can have the active/inactive, direction and number of row command instructions, with respective instruction values associated there with. The commands are stored in associated register addresses identified by command format 402, and can be executed sequentially by a skipping engine, as described herein. FIGS. 5 and 6, infra, give a specific example of a set of skipping commands and how those skipping commands select a subset of rows for output from an optical sensor.

FIG. 5 illustrates a diagram of an example series of skipping commands 500 according to a particular aspect(s) of the subject disclosure. Series of skipping commands 500 is arranged in a skipping command table 502 for illustrative purposes. Series of skipping commands 500 are configured to provide a 2-to-1 vertical skipping pattern depicted at FIG. 6, infra.

Skipping command table 502 is formatted to include three general columns; the general columns include skip command instructions 504, skip command identifier 506 and serial to parallel interface (SPI) writes 508. Skip command instructions 504 is broken into respective command instructions, including active column 510, direction column 512 and number of rows column 514. These columns match the names of the command instructions for the skipping command configuration of FIG. 4, supra. Active column 510 indicates the state of the active/inactive command instruction for respective skipping commands, indicated by the instruction value (e.g., 0 for inactive; 1 for active) of respective skipping commands. The skip command identifier 506 is an identifier for distinguishing respective skipping commands in series of skipping commands 500. SPI writes 508 includes columns for register address 516 and register data 518, respectively.

The first skipping command is associated with skip command identifier 0. As indicated under skip command functions column 504, skip command 0 is active (having instruction value of 1 for active/inactive command instruction), forward skipping direction (having instruction value of 0) and number of rows 1. Thus, skip command 0 causes a skipping engine to move to the next row (e.g., from row 0 to row 1, etc.) and output data from that next row. Skip command 1 is active, forward skipping direction, and skipping three rows. Thus, skip command 1 causes the skipping engine to proceed from the next row (e.g., row 1) to three rows beyond the next row (e.g., row 4), and output data from that third row beyond the next row. Skip command 2 is inactive (having instruction value of 0 for active column 510). According to some programming protocols disclosed herein, an inactive command can cause the skipping engine to ignore the current command, skip command 2, and return to a first command in a series of skipping commands. For series of skipping commands 500, the first command is skip command 0. Thus, no data is output upon executing skip command 2. Skip command 0 causes the skipping engine to move to a subsequent row from the current row (e.g., from row 4 to row 5) and output data from the subsequent row. Specific data output according to series of skipping commands 500 is provided by FIG. 6, infra.

FIG. 6 depicts a diagram of an example row output 600 for an optical sensor according to series of skipping commands 500 of FIG. 5, supra. Row output 600 comprises an instruction block 602 describing the row output activity for each row of photodetectors for an optical sensor (e.g., see FIG. 2, supra). Row output 600 further comprises a graphical depiction 604 illustrating rows of photodetectors outputting data, and rows of photodetectors not outputting data, according to series of skipping commands 500.

Skip command 0 is executed in conjunction with row 0. Skip command 0 is active causing a skipping engine to output data from row 0. The skip direction is forward and number of rows value is one for skip command 0, so the skipping engine advances to row 1 and executes the next command (e.g., skip command 1). Row 1 coincides with skip command 1. Skip command 1 is active causing the skipping engine to output data for row 1. Skip command 1 causes the skipping engine to jump forward three rows, to row 4. Thus, as depicted in graphical depiction 604, row 0 is output, row 1 is output, but rows 2 and 3 are not output. At row 4, skip command 2 is executed. Because skip command 2 is inactive, the skipping engine ignores skip command 2 and returns to skip command 0, which is active causing the skipping engine to output data of row 4, and skip to row 5. Skip command 1 is executed for row 5, causing the skipping engine to output data for row 5, and then skip three rows to row eight, and so on. As is clear form graphical depiction 604, series of skipping commands 500 cause two rows to be output, two to be skipped, two more to be output, two to be skipped, and so on.

Row output 600 is an example of a simple 2-to-1 vertical skipping configuration. As described, this 2-to-1 vertical skipping configuration can be performed with a series of three skipping commands. Conventionally, such a 2-to-1 vertical skipping arrangement can be done with hardware configured (generally permanently) to execute those same three commands. However, the hardware configuration would be limited in the number of modes it can support (generally just one). Thus, other skipping modes (e.g., a 3-to-1 vertical skipping arrangement, a 1-to-1 vertical skipping arrangement, etc.) and mixing modes (e.g., see FIGS. 7-9, infra) would generally require additional hardware modules for each additional mode.

Figure 13:
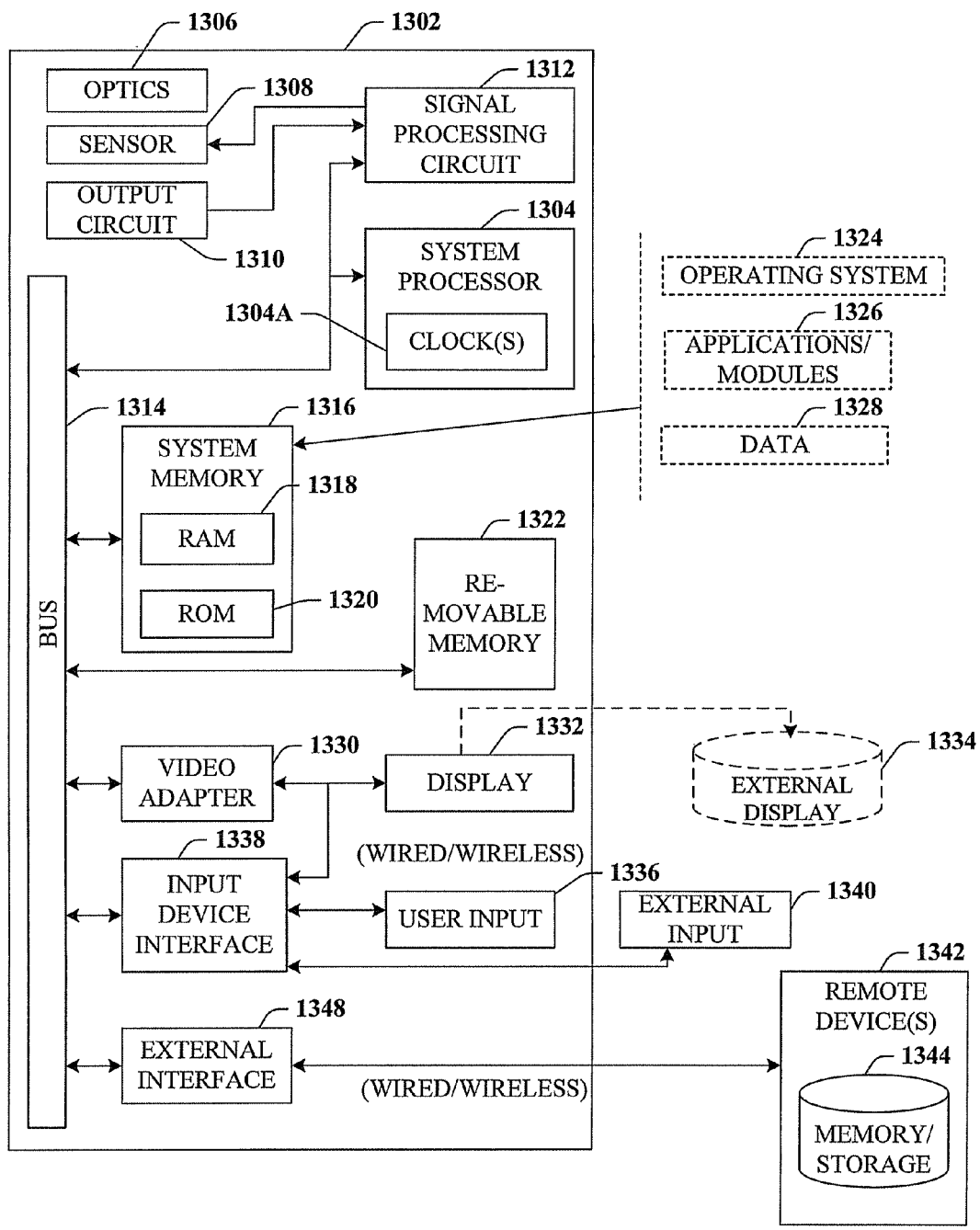
FIG. 13 depicts a sample operating environment for that can be employed in accordance with various disclosed aspects.

In contrast to hardware skipping or mixing applications, output control system 104, output control system 212, data readout system 300, and so on, are programmable and thus not limited to a single skipping or mixing mode. These systems can implement a very large number of skipping or mixing modes simply by receiving and executing suitable series of commands. In one instance, these commands can be fixed for a given electronic device (e.g., where the commands match an optical sensor to the needs of a digital display of that electronic device). In other aspects, these commands can be at least in part re-programmable for that electronic device, through a suitable interface (e.g., a user command interface such as depicted in FIG. 13, infra, including user input 1336, external input 1340 or remote device(s) 1342). Programmable installations can make many error corrections simpler and less costly, particularly where a different series of commands can correct an error, rather than generating new hardware to do the same. Thus, the various aspects of the subject disclosure can provide for significant improvements in flexibility, reduction in overhead costs, and even compatibility with various devices before or after manufacture, which generally cannot be achieved with conventional implementations.

Figure 7:
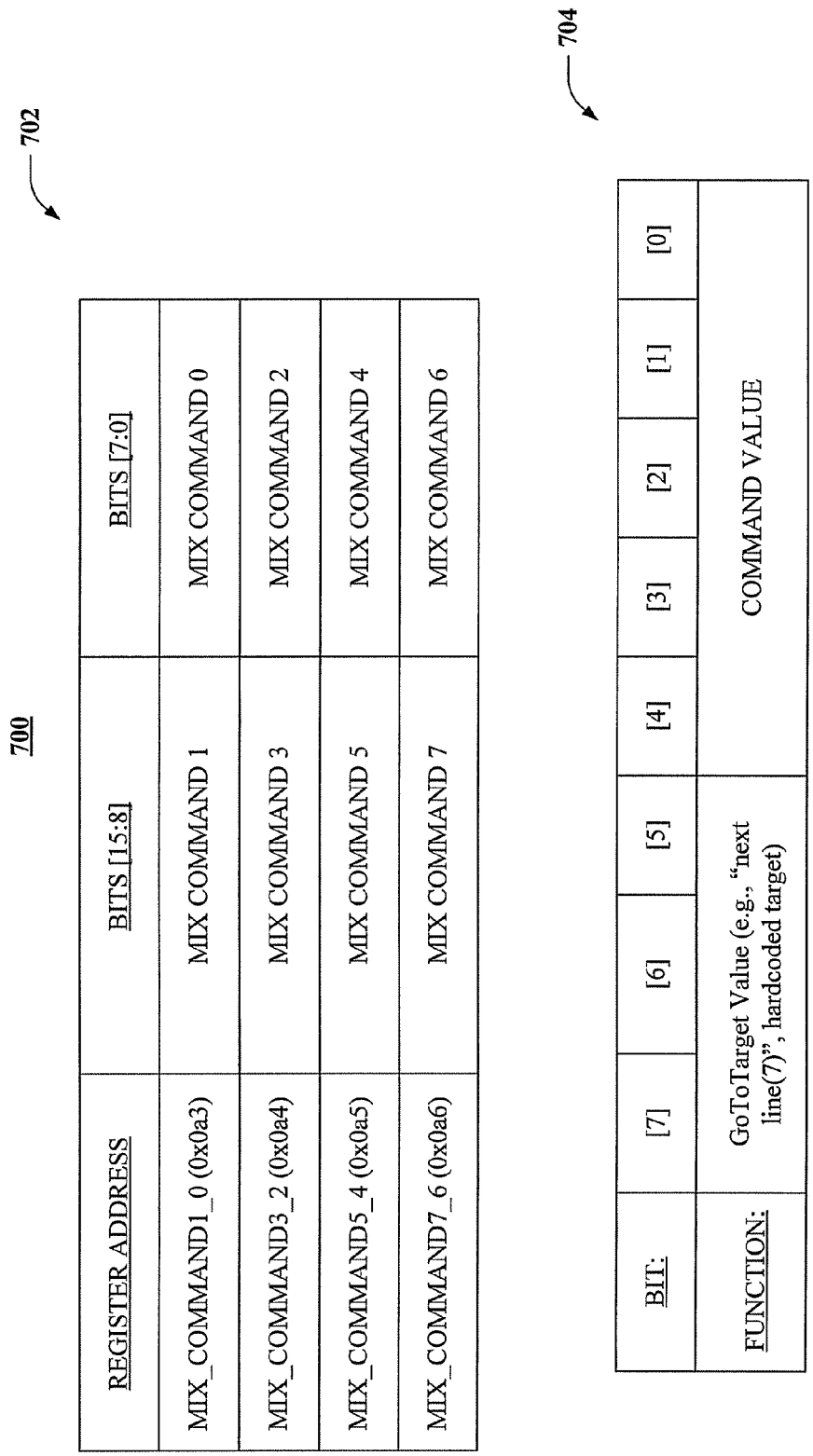
FIG. 7 illustrates a diagram of an example command structure for programmable mixing functionality according to additional aspects.

FIG. 7 illustrates a diagram of an example mixing code configuration 700 according to additional aspects of the subject disclosure. Mixing code configuration 700 includes a register address table 702 as well as a command format 704. Register address table 702 provides an example addressing mechanism to queue sets of mixing commands to be executed by a suitable mixing engine (e.g., see FIG. 3, supra). Command format 704 depicts an example logical association between command bits and instruction primitives for mixing code configuration 700. It should be appreciated that other suitable logical associations and addressing mechanisms are considered to be within the scope of the subject disclosure.

Register address table 702 includes four addresses having sixteen bits each. Each address can hold two eight-bit mixing commands. As depicted, address 0x0a3 can hold mixing command 0 and mixing command 1. Address 0x0a5 holds mixing command 2 and mixing command 3. Likewise, address 0x0a5 holds mixing command 4 and mixing command 5. Address 0x0a6 holds mixing command 6 and mixing command 7.

Command format 704 provides the logical association between instruction primitives (or mixing functions) and subsets of bits of respective commands. As depicted, command format 704 comprises two mixing functions, a goto target value, and a command value. The goto target value specifies a line or set of lines that are targeted by a mixing command. The command value identifies and calls a particular line mixing function to act upon data contained in the line or set of lines. Thus, the mixing command identifies lines of data and an function to process that data. Examples of such line mixing functions, including respective descriptions and example instruction values for calling respective mixing functions are listed below. Note that this is not intended to be an exhaustive list, merely one set of suitable mixing commands that can be supplemented or replaced, in part or in whole, but other suitable mixing commands.

An example set of mixing commands can include a MIX_NOP command. The MIX_NOP command involves no operation. Thus, no action upon data is taken in response to the MIX_NOP command. An example command value for the MIX_NOP command can be 0, 10, or 20, for instance. Another example mixing command is the MIX_ZERO_MEM command, which writes a value of zero to memory. This command can have a value of 1, 11, 21, or the like. An additional command can be a MIX_WRITE_TO_MEM command. This command writes pixel data from a current line (or row) into memory (e.g., memory 316 of FIG. 3). In at least one aspect, this command can be configured to overwrite existing line/row pixel data (at least for a current line/row) held in memory. The MIX_WRITE_TO_MEM command can have an instruction value of 3, 13, 23, ... , in this example.

In addition to the foregoing, the example set of mixing commands can include a MIX_READ_ADD_SEND_DIV3 command. This command can generate a 3-to-1 mixing pattern. Particularly, this command adds current line/row pixel data to line/row pixel data already held in memory, to obtain a line/row pixel data sum. The line/row pixel data sum is then divided by three to obtain a line/row pixel data average. This line/row pixel data average is then output for further processing (e.g., video processing, image processing, etc.). Generally, the MIX_READ_ADD_SEND_DIV3 command is preceded by two other mixing commands to acquire an average of three lines/rows. Particularly, the command can be preceded by the MIX_WRITE_TO_MEM command, to write a first line/row of pixel data to memory, then by the MIX_ADD_TO_MEM command, to add a second line/row of pixel data to the first, and then the MIX_READ_ADD_SEND_DIV3 command is provided to add a third line/row of pixel data to the previous two, read the result of the addition, divide by three to get the average, and output the average.

Similar to the previous command, the set of mixing commands can include a MIX_READ_ADD_DIV2 command. This command adds the current line/row of pixel data to that already in memory, reads out the product of the addition, and divides the product by two to obtain the average of two lines/rows of pixel data. This average is then output for further processing. This command is generally preceded by a MIX_WRITE_TO_MEM command.

MIX_OVERLAP is another example mixing command. This command adds the current line/row of pixel data to the existing line/row of pixel data stored in memory. The product of the addition is divided by two to acquire an average of two lines/rows of pixel data, and the average is sent out. In addition, the current line/row of pixel data is then written to memory (overwriting the previous line/row of pixel data stored in memory). The MIX_OVERLAP command can be useful in averaging row data of successive rows to mitigate noise, for instance. As an example, consider rows 10, 11, 12 and 13 of an optical sensor. One way to provide noise mitigation is to output an average of rows 10 and 11, of rows 11 and 12, of rows 12 and 13, and so on. The MIX_OVERLAP command can facilitate this functionality with a minimum number of mixing commands. A MIX_WRITE_TO_MEM command can write row 10 to memory, and a MIX_OVERLAP command then adds row 11 to row 10 in memory, takes the average, sends out the average, and then overwrites row 10 with row 11 in memory. A subsequent MIX_OVERLAP command adds row 12 to row 11, obtains and outputs the average, and overwrites row 11 in memory with row 12. A further MIX_OVERLAP command adds row 13 to row 12, takes and outputs an average of rows 12 and 13, and overwrites row 12 in memory with row 13, and so on.

Another example mixing command includes a MIX_WRITE_PASSTHROUGH command. This command writes a current line/row of pixel data to memory (overwriting any previous pixel data) and outputs the current line/row of pixel data. In other words, this command both writes and outputs a current line of data. A MIX_ADD_CLIP command adds pixel data from a current line to data stored in memory, clips the sum if greater than a defined value (e.g., where the defined value is stored in memory), and outputs a result thereof. Clipped data (data that is greater than the defined value) is output as the defined value instead. The MIX_ADD_CLIP command does not write the current pixel data to memory. This command therefore is similar to MIX_ADD_TO_MEM, except that it caps the sum to a maximum value (the defined value).

The example set of mixing commands can be configured to match command format 704 and register address table 702 of FIG. 7. Thus, bits 5-7 of command format 704 can identify one or more lines of data, and bits 0-4 identify one of the above mixing commands to operate on the identified lines of data. The eight mixing commands can be stored in four registers at addresses identified by register address table 702.

As previously mentioned, the above example mixing commands are not an exhaustive list. Yet, it can be readily deduced that different combinations of these mixing commands—optionally in conjunction with one or more vertical skipping commands—provide great flexibility in selecting and processing data from an optical sensor. Examples of different skipping/mixing combinations that can be achieved include 1-of-2 skipping (skipping every other row), 2-line mixing with no skipping, 2-line duplex mixing with no skipping, 1-of-3 skipping, 1-of-3 duplex skipping, 2-of-3 skipping with 2-line mixing, 3-line mixing with no skipping, 1-of-4 skipping, 2-of-4 skipping with 2-line mixing, 2-of-4 skipping with 2-line duplex missing, 3-of-4 skipping with 3-line mixing, 1-of-5 skipping, 2-of-5 skipping with 2-line mixing, 3-of-5 skipping with 3-line mixing, 1-of-6 skipping, 2-of-6 skipping with 2-line mixing, 3-of-6 skipping with 3-line mixing, 1-of-7 skipping, 2-of-7 skipping with 2-line mixing, 3-of-7 skipping with 3-line mixing, as well as various other skipping or mixing combinations.

FIG. 8 illustrates a diagram of an example set of mixing commands 800 that facilitate a 2-to-1 non-overlapping mixing mode, according to a particular aspect of the subject disclosure. The mixing mode is illustrated by a table having an action column 802, describing activity performed by respective commands of the set, a mixing command number column 804 to distinguish respective mixing commands, and an SPI writes column 806. Action column 806 has three sub-columns, including command name column 808, goto target value column 810, and command value column 812. Command value column 812 includes a value identifying one of the above example mixing commands. The identifiers are as follows: MIX_NOP=0, MIX_ZERO_MEM=1, MIX_WRITE_TO_MEM=2, MIX_ADD_TO_MEM=3, MIX_READ_ADD_SEND_DIV3=4, MIX_READ_ADD_SEND_DIV2=5, MIX_OVERLAP=6, MIX_WRITE_AND_PASSTHROUGH=6, and MIX_ADD_AND_CLIP=7.

Mix command number 0 is a MIX_WRITE_TO_MEM command. It has a goto target value of 7 and command value of 2, which is associated with the write to memory command. According to one alternative, or additional aspect of the subject disclosure, the goto target value of "7" can be defined as an "advance to the next line" command, rather than advance to the line identified by the goto target value (e.g., line 7 in this case). Thus, a mixing engine executing this command will write pixel data for a current line to memory, and will proceed to the next line number in response to the goto value of 7. As indicated by register address column 814, mix command number 0 is stored at bits 0 to 7 of register 0x0a3. Register data column 816 indicates the binary data associated with this command as well as the address where this data is stored. Mix command number 1 is also a MIX_WRITE_TO_MEM command, with a goto target value of 7, and command value of 2 that calls the WRITE_TO_MEM function. This command is stored in bits 8 to 15 of register 0x0a3, having register data similar to mix command number 0. Mix command number 2 is a MIX_READ_ADD_SEND_DIV2 command having goto target value of 7 and command value of 5. As indicated above, the command value of 5 calls the READ_ADD_SEND_DIV2 function. This command is stored in bits 0 to 7 of register address 0x0a4. Mix command number 3 is a MIX_READ_ADD_SEND_DIV2 command having goto target value of 0, and command value of 5, calling the READ_ADD_SEND_DIV2 function. This command is stored in bits 8 to 15 of register address 0x0a4 having the listed register data. Execution of set of mixing commands 800 on an example set of image sensor lines is described below at FIG. 9.

Figure 9:
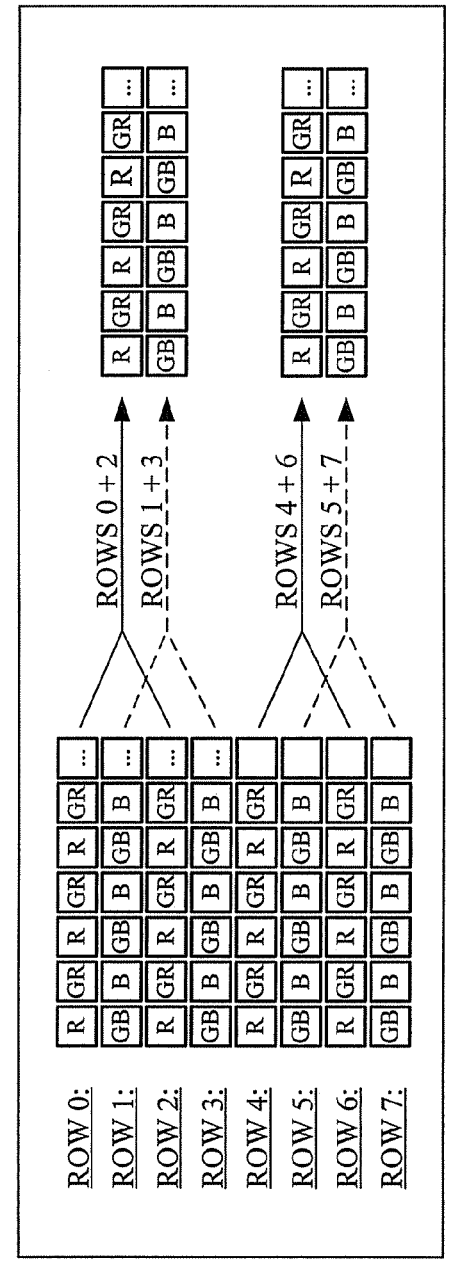
FIG. 9 illustrates a sample diagram of executed instructions for the example mixing function of FIG. 8.

FIG. 9 depicts a diagram of an example row output 900 for a subset of optical sensor rows according to set of mixing commands 800 of FIG. 8, supra. Row output 900 includes a command description 902 applied to respective rows of the subset of rows. In addition, row output 900 includes a graphical depiction 904 of a subset of optical sensor rows processed in accordance with the set of mixing commands 800. The subset of optical sensor rows comprises pixels that are sensitive to two different color schemes, in alternating rows. Even pixel rows 0, 2, 4, 6, and so on, are red pixel lines that include red and green pixels (denoted R and GR pixels, respectively) sensitive to a first set of colors (e.g., red and green). Odd pixel rows 1, 3, 5, 7, . . . , are blue pixel lines that include green and blue pixels (denoted GB and B pixels, respectively) sensitive to a second set of colors (e.g., green and blue), as depicted. As described below, set of mixing commands 800 is configured to average pixel data from selected rows of like color schemes, and output results of the averaging.

A mixing engine (e.g., mixing engine 308 of FIG. 3, supra) can be configured to access and execute respective commands of set of mixing commands 800. The mixing engine starts with mixing command 0 applied to row 0. As shown by command description 902, mixing command 0 causes the mixing engine to call a write data to memory function, thereby writing pixel data from row 0 to memory. Note that the mixing engine can be configured to act upon pixel rows associated with different color schemes separately. Thus, in at least one aspect of the subject disclosure, separate memory registers can be provided for storing pixel data associated with different color schemes. Through proper command configuration then, command functions can be operated on one set of color scheme data independently from another set of color scheme data, as will be evident from command description 902. Accordingly, the mixing engine can save pixel data for row 0 into a blue-green memory register, maintained separately from green-red memory registers. Because goto target value of mixing command 0 is 7, the mixing engine proceeds to the next row, row 1 and executes mixing command 1.

Mixing command 1 has a command value of 2 that calls a write data to memory function. Because row 1 is a green-blue color scheme, the mixing engine can be configured to write pixel data from row 1 to a separate portion of memory associated with the green-blue color scheme, and thus writing row 1 to memory will not erase pixel data from row 2 stored in a red-green portion of the memory. Mixing command 1 has a goto target value of 7, causing the mixing engine to proceed to row 2 and execute mixing command 2.

Following command description 902, the mixing engine identifies a command value of 5 and calls the read, add, send and divide-by-2 function associated with this command value. In response, pixel data from row 2 is read, added to the pixel data in the red-green portion of the memory (from row 0), the sum divided by two, and the result sent out. This is the upper red-green pixel row on the right side of graphical depiction 904, derived from rows 0 and 2. Mixing command 2 has a goto target value of 7, causing the mixing engine to proceed to the next row and execute the next mixing command in set of mixing commands 800.

At row 3, the mixing engine executes mixing command 3. This command has a command value of 5, calling the read, add, send and divide-by-2 function. Because row 3 is a green-blue color scheme, pixel data from for 3 is read, added to existing pixel data in the green-blue portion of the memory (pixel data from row 1), averaged, and sent out. As shown on the right hand side of graphical depiction 904, this is the upper row of green-blue pixel data derived from rows 1 and 3. Mixing command 3 has a goto target value of 0, causing the mixing engine to return to mixing command 0 after executing mixing command 3. Thus, row 4 is processed according to mixing command 0.

Following command description 902, the mixing engine re-executes mixing command 0 with respect to row 4, and writes pixel data from row 4 to the red-green portion of the memory (overwriting previous data written to the red-green portion of the memory). Mixing command 1 is executed with respect to row 5, and pixel data from row 5 is written to the green-blue portion of the memory (also overwriting the green-blue portion of the memory). Next, mixing command 2 is executed for row 6, adding pixel data from row 6 to that stored in the red-green portion of the memory (from row 4), dividing by 2 and sending it out. This is shown in the lower right hand side of graphical depiction 904, as the red-green row derived from rows 4 and 6. Mixing command 3 is executed with regard to row 7, adding pixel data from row 7 to the existing data stored in the green-blue portion of the memory (for row 5), averaging the sum and sending out the average. This is shown in the lower right hand portion of graphical depiction 904 as the green-blue pixel data derived from rows 5 and 7. Moreover, mixing commands 0 through 3 can be repeated, as described above, for each set of four rows (e.g., rows 8-11, rows 12-15, and so on) until every row of a given frame is processed.

Thus, FIGS. 8 and 9 accomplish a relatively complicated mixing mode. Particularly, the averaging and readout of every other row associated with a particular color scheme, for an optical sensor having two color schemes. Moreover, it is anticipated that those of ordinary skill in the art could foresee other examples for programmatic readout and processing of optical sensor data based on the context provided herein (e.g., optical sensor with three color schemes, with one color scheme, averaging every third row, or the like, or suitable combinations thereof). These examples are considered part of the subject disclosure. Moreover, based on these programmatic protocols, various readout and processing modes can be implemented without dedicated hardware for each mode or set of related modes, significantly reducing cost, overhead and time associated with optical sensor readout devices. This provides significant advantages over conventional readout systems.

Figure 10:
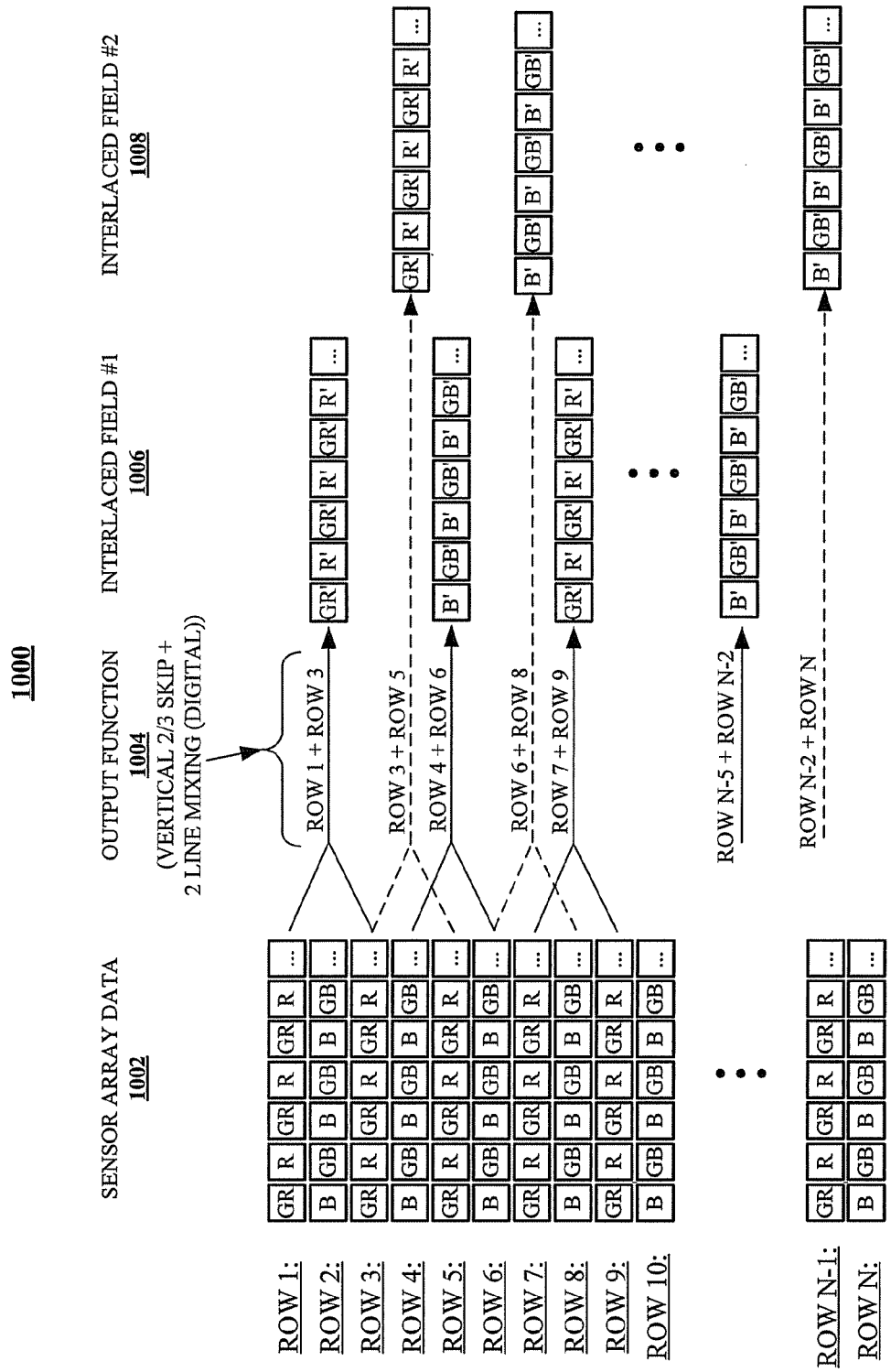
FIG. 10 illustrates a diagram of an example of integrated skipping and mixing functionality for image sensor data output according to an aspect.

FIG. 10 depicts a diagram of an example data readout 1000 for a combined skipping and mixing mode, according to further disclosed aspects. Data readout 1000 illustrates application of a combined vertical 2-of-3 skipping mode and 2-line mixing mode on an optical sensor. In addition, the optical sensor has two color schemes with green-red pixels and blue-green pixels in alternating rows of the optical sensor. The pixel data output in response to the 2-of-3 skipping and 2-line mixing is segmented into two interlaced fields.

Interlaced fields can be accomplished according to multiple implementations. One example includes interlacing by color. Interlacing by color can be implemented, in a first instance, where a mixing engine is configured to segregate even lines from odd lines. In this instance a write to memory function will write even lines to a first memory bank, and odd lines to a second memory bank, thereby segregating the even and odd lines. In a second instance, memory bank-specific versions of mixing commands can be provided. As an illustration, MIX_WRITE_TO_MEM_B0 can be configured to write a line of data to an even memory bank, whereas MIX_WRITE_TO_$_{MEM\_}$B1 can be configured to write a line of data to an odd memory bank. A similar configuration can be provided for other mixing commands disclosed herein, or known in the art. Without the B0 or B1 suffix on the mixing command, a mixing engine can be configured to choose a bank based on even number or odd number lines. In at least one aspect, this configuration can be disabled, causing the mixing engine to write all line data to a common memory bank instead. This latter aspect can be referred to as monochrome mode, which might be used for black-and-white image/video functionality.

Data readout 1000 illustrates a set of sensor rows 1002 of an optical sensor having a two color scheme. Set of sensor rows 1002 is arranged starting from the top of the figure at row 1 through row N at the bottom of the figure. The two color schemes occupy alternating rows of pixels, with green-red pixels in odd numbered rows (e.g., rows 1, 3, 5, 7, . . . ) and blue-green pixels in even numbered rows (e.g., rows 2, 4, 6, 8, . . . ).

Output function 1004 describes actions performed by skipping and mixing functionality on respective subsets of set of sensor rows 1002. These actions generate processed pixel data for interlaced field #1 1006 and processed pixel data for interlaced field #2 1008. Note that pixel rows of different color schemes are processed independently in data readout 1000. Further, pre-processed data in set of sensor rows 1002 is indicated by the GR, R, GR, pixels in green-red pixel rows, or B, GB, B, . . . , pixels in blue-green pixel rows, respectively. Post-processed data in interlaced field #1 1006 and interlaced field #2 1008 is indicated by GR', R', GR', in green-red pixel rows and indicated by B', GB', B', . . . , in blue-green pixels, respectively.

Following output function 1004, the 2-of-3 skipping and 2-line mixing starts by averaging row 1 and row 3, both green-red color scheme rows, and outputting an average of these rows to interlaced field #1 1006. Row 3 and row 5 are also green-red color scheme rows, and are averaged and output to interlaced field #2 1008. Next, row 4 and row 6, blue-green color scheme rows, are averaged and output to interlaced field #1 1006, whereas row 6 and row 8, also blue-green color scheme rows, are averaged and output to interlaced field #2 1008. This 2-of-3 skipping and 2-line mixing continues for all rows of the set of sensor rows 1002, up through row N-1 and row N. The final row output includes an average of row N-2 and row N, which is provided for interlaced field #2 1008. Note that some rows, such as row 2, may not be utilized to derive output data for either interlaced field #1 1006 or interlaced field #2 1008.

FIG. 10 provides a relatively complicated but realistic example of a combined skipping and mixing function for an optical sensor. A set of programmatic commands could be constructed to implement this 2-of-3 vertical skipping and 2-line mixing functionality, for instance based on the command primitives disclosed herein. When performed programmatically via a system configured to implement skipping and mixing in response to commands, rather than with dedicated analytic hardware, significant advantages can be realized. First, such a system can support a wide range of modes with a common hardware/software implementation. This tends to increase a number of modes that can be supported for a given design cost and manufacture cost. Moreover, testing, troubleshooting and error correction tend to become simpler and more cost effective, as new hardware generally will not be needed to remedy design or implementation errors. These advantages can potentially revolutionize optical sensor data readout, providing improved flexibility, lower cost, and even field programmable configuration in some instances. Accordingly, the subject disclosure provides significant advantages over conventional mechanisms.

The aforementioned diagrams have been described with respect to interaction between several systems, apparatuses, components, electronic circuits, or optoelectronic devices. It should be appreciated that such diagrams can include those components or systems specified therein, some of the specified components, or additional components. For example, a system could include optical sensor array 202, readout circuit 204 and output control system 302, in conjunction with memory 316. Sub-components could also be implemented as architectures electrically connected to other sub-components rather than included within a parent architecture. Additionally, it should be noted that two or more components could be combined into a single component providing aggregate functionality. For instance, command interface 310 can include input/output interface 314 to facilitate receiving data readout commands and receiving and outputting sensor data by way of a single component. Components of the disclosed systems and apparatuses can also interact with one or more other components not specifically described herein but known by those of skill in the art, or made known to one of skill in the art by way of the context provided herein.

Figure 11:
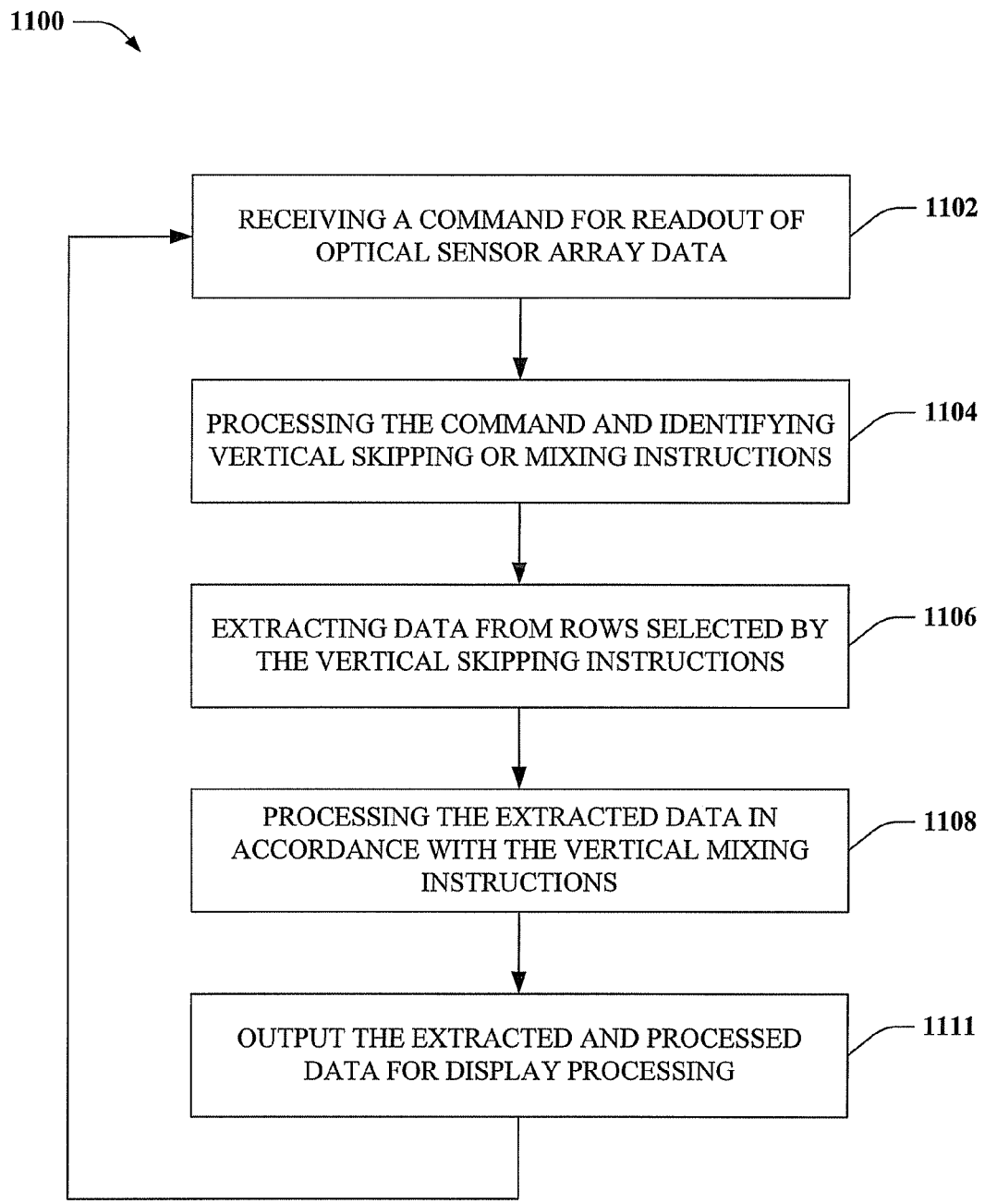
FIG. 11 depicts a flowchart of an example method providing programmable data output for an image sensor according to other aspects.
Figure 12:
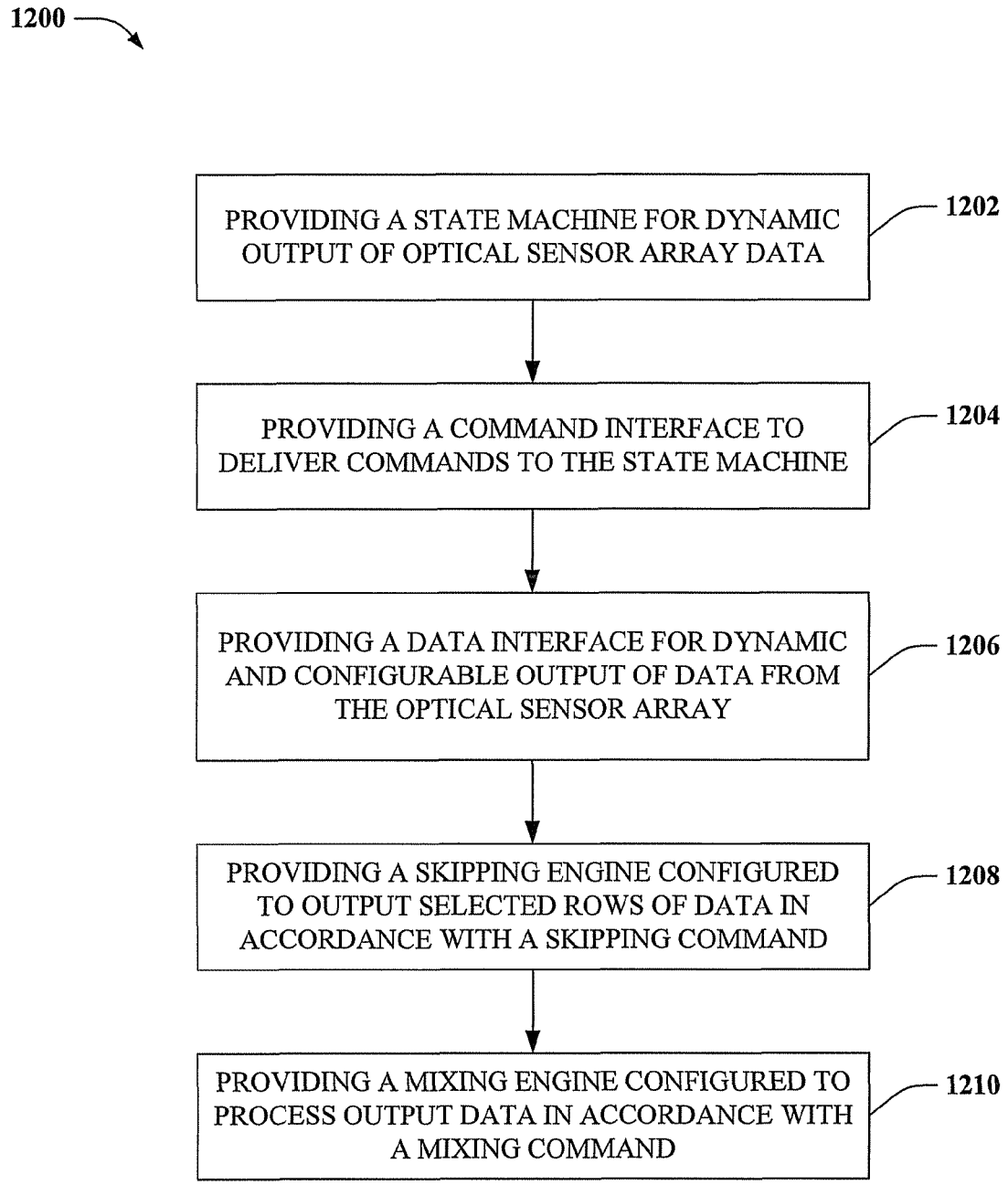
FIG. 12 illustrates a flowchart of a sample method for providing dynamic output circuitry for an image sensor according to another aspect.

In view of the exemplary diagrams described supra, process methods that may be implemented in accordance with the disclosed subject matter will be better appreciated with reference to the flow charts of FIGS. 11-12. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

FIG. 11 illustrates a flowchart of an example method 1100 for providing improvements in data readout from an optical sensor, according to one or more aspects described herein. At 1102, method 1100 can comprise receiving a command configured for dynamic control of data output from an optical sensor array. The command can be configured for skipping one or more rows of the optical sensor array, to prevent data output for the one or more skipped rows, in one aspects of the subject disclosure. In another aspect, the command can be configured for processing a subset of rows of the optical sensor array according to a data processing function(s). In at least one further aspect, the command can be configured for a combination of the foregoing functions.

At 1104, method 1100 can comprise processing the command and identifying a vertical skipping instruction or a vertical mixing instruction. The method can further comprise extracting the dynamic skipping or mixing instruction or associated instruction values from the command, where suitable. At 1106, method 1100 can comprise extracting data from a row(s) selected or identified by a vertical skipping instruction. At 1108, method 1100 can comprise processing the extracted data in accordance with a mixing function referenced by the vertical mixing instruction.

In at least one aspect, subsequent commands can be executed in a similar fashion as described with respect to reference numbers 1102-1108, to compile a subset of selected or processed data from the optical sensor. In a particular disclosed aspect, method 1100 can further comprise identifying an active state of a skipping command, or identifying a goto value of a mixing command. In response to the active state being inactive, method 1100 can return to and execute a prior skipping instruction. In response to the active state being active, on the other hand, method 1100 can identify a number of rows for skipping and a direction for the skipping, and output or extract data from a row identified or selected by the direction and the number of rows. Likewise, in response to the goto value having a first predefined value, method 1100 can execute a mixing instruction and proceed to a subsequent mixing instruction. In response to the goto value having a second predefined value, method 1100 can instead execute the mixing instruction and proceed to a predetermined prior mixing instruction, instead.

At 1110, method 1100 can comprise outputting the extracted and processed data. This extracted and processed data can be compiled from a single skipping or mixing instruction, or from a set of skipping or mixing instructions, before being output at reference number 1110. The extracted and processed data can be output for display processing, for data storage, or the like, or a suitable combination thereof.

FIG. 12 depicts a flowchart of an example method 1200 according to further aspects of the subject disclosure. Particularly, method 1200 can comprise a method for assembling, manufacturing or fabricating, etc., a dynamic data processing system for an optical sensor array. At 1202, method 1200 can comprise providing a state machine for ordered receipt, storage and execution of data readout or data processing commands. In at least one aspect, the data readout or data processing commands can comprise one or more vertical skipping or vertical mixing commands configured to achieve dynamic output of optical sensor array data. At 1204, method 1200 can comprise providing a command interface to deliver commands to the state machine. At 1206, method 1200 can comprise providing a data interface for dynamic and configurable output of data from the optical sensor array. Moreover, at 1208, method 1200 can comprise providing a skipping engine configured to output selected rows of data of the optical sensor array in accordance with one or skipping commands, or providing a mixing engine configured to process data output from the optical sensor array in accordance with one or more mixing commands.

Referring now to FIG. 13, there is illustrated a block diagram of an exemplary digital camera system operable to execute the disclosed architecture. In order to provide additional context for various aspects of the various embodiments, FIG. 13 and the following discussion are intended to provide a brief, general description of a suitable electronic computing environment 1300 in which the various aspects of the various embodiments can be implemented. Additionally, while the various embodiments described above may be suitable for application in the general context of instructions that may run or be executed in conjunction with an electronic device, those skilled in the art will recognize that the various embodiments also can be implemented in combination with other program modules and/or as a combination of hardware and software.

Generally, program modules include routines, programs, components, data structures, etc., that perform particular tasks associated with electronic computing environment 1300. Moreover, those skilled in the art will appreciate that the inventive methods can be practiced with other electronic system configurations, including hand-held computing devices, microprocessor-based or programmable consumer electronics, single-processor or multiprocessor state machines, minicomputers, as well as personal computers, and the like, each of which can be operatively coupled to one or more associated devices.

The illustrated aspects of the various embodiments may also be practiced in distributed computing environments where certain tasks are performed by remote processing devices that are linked through a wired or wireless communications network. In a distributed computing environment, program modules can be located in both local and remote memory storage devices.

An electronic processing device typically includes a variety of computer-readable media. Computer-readable media can be any available media that can be accessed by the electronic processing device and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, or any other medium which can be used to store the desired information and which can be accessed by the electronic processing device.

Continuing to reference FIG. 13, the exemplary electronic processing environment 1300 for implementing various aspects of one or more of the various embodiments includes a digital camera 1302, the digital camera 1302 including a system processor 1304, optics 1306, an image sensor 1308, an output circuit 1310, a signal processing circuit 1312, a system memory 1316 and a system bus 1314. The system bus 1314 couples to system components including, but not limited to, the system memory 1316 to the system processor 1304. The system processor 1304 can be a suitable semiconductor processing device manufactured for digital camera 1302, or any of various commercially available processors. Dual microprocessors and other multi-processor architectures may also be employed as the system processor 1304.

Optics 1306 can comprise one or more lens elements comprised of refractive material. The refractive material can be suitable to refract electromagnetic radiation, particularly in the visible spectrum, but also the near infrared or ultraviolet spectra, or other suitable spectra. Particularly, optics 1306 can be configured to project and focus an image of an object onto image sensor 1308. Optics can also be configured with an actuator (not depicted) to mechanically adjust optics 1306 to focus objects at varying distances from digital camera 1302.

Image sensor 1308 can comprise any of various sensors for receiving electromagnetic radiation and generating electric signals proportionate to a magnitude of the electromagnetic radiation. For instance, image sensor 1308 can comprise a video tube, a charge-coupled device, or a CMOS device, or the like, or an array of such devices. In a particular example, image sensor 1308 can comprise an array of photodetectors as described herein (e.g., optical sensor array 102, optical sensor array 202, etc.). Electric signals generated by image sensor 1308 can be transferred to output circuit 1310, in response to a clock signal generated by an electronic clock(s) 1304A managed by system processor 1304. The electric signals can then be output to signal processing circuit 1312 for image processing.

Signal processing circuit 1312 can be any suitable hardware or software processing entity, including an integrated circuit(s), an application specific integrated circuit(s) (ASIC), a state machine, or other suitable signal processing device. Signal processing circuit 1312 can be configured to perform operations on electric signals provided by output circuit 1310. These operations can include correlated double sampling, gamma processing, analog to digital conversion, gain adjustment, interpolation, compression, or a combination thereof or of the like, to generate digital data to be adapted for presentation on an electronic display 1332 of digital camera 1302. Additionally, signal processing circuit 1312 can store the digital data in system memory 1316 before, during and after the operations.

The system bus 1314 can be any of several types of bus structure suitable for communicatively connecting components of digital camera 1302. System bus 1314 can further interconnect to a memory bus (with or without a memory controller), a peripheral bus, and a local bus using any of a variety of commercially available bus architectures. The system memory 1316 can include read-only memory (ROM) 1320 and random access memory (RAM) 1318. A basic input/output system (BIOS) for digital camera 1302 can be stored in a non-volatile memory 1320 such as ROM, EPROM, EEPROM, which BIOS contains the basic routines that help to transfer information between elements within the digital camera 1302, when powered on for instance. The RAM 1318 can also include a high-speed RAM such as static RAM for caching data. Furthermore, digital camera can include removable memory 1322, which can include any suitable non-volatile memory (e.g., Flash memory), or other removable memory technology.

A number of program modules can be stored in the system memory 1316, including an operating system 1324, one or more application programs or program modules 1326 and program/data 1328. All or portions of the operating system, applications, modules, and/or data can also be cached in the RAM 1318 It is appreciated that the various embodiments can be implemented with various commercially available or proprietary operating systems or combinations of operating systems.

A display 1332 is also connected to the system bus 1314 via an interface, such as a video adapter 1330. Display 1332 can comprise a flat panel display, such as a liquid crystal display, a light-emitting diode display, or the like. System processor 1304 can control output of image data to present a digital replica of the image received by image sensor 1308 on display 1332. In addition, digital camera 1302 can output the image data to an external display 1334 via a suitable external interface 1348.

A user can enter commands and information into the digital camera 1302 through one or more input devices, e.g., touch screen buttons, switches, dials, levers, etc. For instance, zoom functionality is often implemented by pressing a button, dial, lever, etc., in one direction to zoom in, or another direction to zoom out. Further, display options, selection of images, and similar display commands can be input via a touch screen, often implemented as part of display 1332. Other input devices (not shown) may include a microphone, an IR remote control, a joystick, a game pad, a stylus pen, or the like. These and other input devices are often connected to the system processor 1304 through an input device interface 1338 that is coupled to the system bus 1314, but can be connected by other interfaces, such as a parallel port, an IEEE1394 serial port, a game port, a USB port, an IR interface, a Bluetooth interface, etc.

The external interface 1348 can include at least one or both of Universal Serial Bus (USB) and IEEE1394 interface technologies. Other external connection technologies are within contemplation of the subject matter claimed herein. Moreover, external interface 1348 can include a wireless technology, such as a Wi-Fi communication technology, Bluetooth™ technology, infrared (IR) technology, cellular technology, or the like. In addition to an external display, external interface 1348 can facilitate communicatively coupling digital camera 1302 to one or more remote devices 1342. Remote device(s) 1342 can include a computer, a display, a memory or storage device 1344, and so on. Moreover, commands can be given to digital camera 1302 from remote device(s) 1342 over external interface 1348 to system processor 1304. This can facilitate remote control of digital camera 1302, for remote camera operation (e.g., taking pictures, adding or deleting pictures from system memory 1316, etc.), transferring data, such as stored digital images, updating operation system 1324, applications/program modules 1326, or data 1328, and so on.

The digital camera 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi, or Wireless Fidelity, allows connection to the Internet from various locations within range of a WiFi access point, without wires. Wi-Fi is a wireless technology similar to that used in a cell phone that enables such devices, e.g., computers, to send and receive data indoors and out; within the range of the access point. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the various embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for reading data from an optical sensor array, comprising:
    a command interface for receiving commands configured for dynamic output or processing of the data;
    a processing engine for accessing and distributing the commands; and
    a set of data engines configured to execute the commands and to control the dynamic output of a subset of the data or to perform logic operations on the data in response to the commands, and comprising a vertical skipping engine configured to select, in response to the processing engine receiving a skipping command, a subset of rows of the optical sensor array from which to compile the subset of data,
    the skipping command comprises a direction instruction associated with a forward value and a reverse value.

2. The system of claim 1, further comprising an input interface connected to a readout path of the optical sensor array for receiving the data.

3. The system of claim 1, wherein the command interface is a serial to parallel command interface (SPI) for receiving and serializing the commands; and the system further comprises a set of registers for storing respective instruction values of the commands, the instruction values are output to the processing engine.

4. The system of claim 1, the skipping command comprises an activation instruction associated with an active value and an inactive value.

5. The system of claim 4, wherein the vertical skipping engine is configured to execute the skipping command in response to the skipping command containing the active value.

6. The system of claim 4, wherein the vertical skipping engine is configured to ignore the skipping command in response to the skipping command containing the inactive value.

7. The system of claim 4, wherein the vertical skipping engine is configured to return to and process a previous skipping command in response to the skipping command containing the inactive value.

8. The system of claim 4, wherein the vertical skipping engine is configured to process the skipping command and proceed to a subsequent skipping command in response to the skipping command containing the active value.

9. The system of claim 1, wherein the vertical skipping engine is configured to skip forward a specified number of rows in response to the skipping command containing the forward value.

10. The system of claim 1, wherein the vertical skipping engine is configured to skip backward a number of rows in response to the skipping command containing the reverse value.

11. The system of claim 1, the skipping command indicates a number of rows to skip in conjunction with selecting a row of the subset of rows.

12. The system of claim 1, the set of data engines comprises a vertical mixing engine configured to act upon the subset of the data in response to the processing engine receiving a mixing command.

13. The system of claim 12, wherein the mixing command incorporates a set of code primitives configured to call a set of line mixing functions to act upon the subset of the data.

14. The system of claim 13, wherein the set of line mixing functions includes at least one of: a data write operation, a data erase operation, a data addition operation, a data averaging operation, a data overlap operation, a data pass-through operation, or a data clipping operation, or a combination thereof.

15. The system of claim 13, wherein the mixing command comprises a goto target value that identifies a line of data for a mixing function to act upon.

16. The system of claim 13, wherein the mixing command comprises a command value that identifies one of the set of code primitives for calling one of the set of line mixing functions for acting upon an identified line of the subset of the data.

17. The system of claim 1, further comprising an output interface for outputting data from the set of data engines to a display engine for display processing.

18. The system of claim 1, wherein the vertical skipping engine is further configured to select, in response to the processing engine receiving a second skipping command, a second subset of rows of the optical sensor from which to compile a second subset of data, wherein the second subset of data is different from the subset of data.

19. The system of claim 18, the set of data engines further comprises a vertical mixing engine configured to, in response to the processing engine receiving a mixing command, select at least a portion of the subset of data and at least a second portion of the second subset of data in conjunction with outputting data from the set of data engines.

20. The system of claim 19, the vertical mixing engine is further configured to, in response to the processing engine receiving a second mixing command, select at least a third portion of the subset of data or at least a fourth portion of the second subset of data, in conjunction with outputting data from the set of data engines.

21. A method for processing data, comprising:
receiving a command configured for dynamic control of data output from an optical sensor array;
processing the command and extracting a skipping or mixing instruction from the command;
identifying an active state of the command;
executing the skipping or mixing instruction in conjunction with extracting at least a subset of the data from the optical sensor array; and
returning to a prior skipping instruction in response to the active state being inactive.

22. The method of claim 21, further comprising selecting a subset of rows of the optical sensor array for data output in accordance with the skipping instruction.

23. The method of claim 21, further comprising processing a subset of rows of the data in accordance with a mixing function referenced by the mixing instruction.

24. The method of claim 21, further comprising executing the skipping or mixing instruction to compile the subset of the data.

25. The method of claim 24, further comprising outputting the subset of the data for graphical processing and display.

26. The method of claim 21, further comprising identifying a number of rows for skipping, and identifying a direction for the skipping in response to the active state being active.

27. The method of claim 21, further comprising receiving a second command, extracting a second skipping instruction from the second command, and executing the second skipping instruction in conjunction with extracting at least a second subset of the data from the optical sensor array, the second subset of the data being different from the subset of the data and having more or fewer bits than the subset of the data.

28. The method of claim 27, further comprising employing the mixing instruction to selectively mix at least a portion of the subset of the data with at least a second portion of the second subset of the data in conjunction with outputting selectively mixed data from the optical sensor array.

29. A method of providing dynamic data processing for an optical sensor array, comprising:
providing a data interface for dynamic and configurable output of data from the optical sensor array;
providing at least one of:
a skipping engine configured to output selected rows of data in accordance with a skipping command; or
a mixing engine configured to process data output from the optical sensor array in accordance with a mixing command;
providing an interface for receiving and storing the skipping command or the mixing command;
providing a state machine for ordered receipt, storage and execution of skipping or mixing commands by the skipping engine or mixing engine; and
providing a data interface to the optical sensor array for dynamic and configurable output of data in accordance with execution of the skipping command or the mixing command.

30. A non-transitory computer-readable medium having stored thereon computer-executable instructions that when executed by an electronic device cause the electronic device to:
receive a command configured for dynamic control of data output from an optical sensor array;
process the command and extract a dynamic skipping or mixing instruction;
execute the dynamic skipping or mixing instruction in conjunction with extracting at least a subset of the data from the optical sensor array;
identify the command as being in an active state or inactive state; and
return to a prior skipping instruction in response to the command being in the inactive state.

* * * * *